United States Patent
Hendry et al.

(10) Patent No.: US 10,158,867 B2
(45) Date of Patent: Dec. 18, 2018

(54) PICTURE ORDER COUNT RESET FOR MULTI-LAYER CODECS

(71) Applicant: QUALCOMM Incorporated, San Diego, CA (US)

(72) Inventors: Fnu Hendry, Poway, CA (US); Adarsh Krishnan Ramasubramonian, San Diego, CA (US); Ye-Kui Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 533 days.

(21) Appl. No.: 14/741,304

(22) Filed: Jun. 16, 2015

(65) Prior Publication Data

US 2015/0373338 A1   Dec. 24, 2015

Related U.S. Application Data

(60) Provisional application No. 62/015,346, filed on Jun. 20, 2014.

(51) Int. Cl.
 *H04B 1/66* (2006.01)
 *H04N 7/12* (2006.01)
 (Continued)

(52) U.S. Cl.
 CPC ......... *H04N 19/187* (2014.11); *H04N 13/161* (2018.05); *H04N 19/107* (2014.11);
 (Continued)

(58) Field of Classification Search
 CPC .............................. H04N 19/30; H04N 19/70
 See application file for complete search history.

(56) References Cited

U.S. PATENT DOCUMENTS

2013/0114741 A1* 5/2013 Sullivan ................. H04N 19/70
                                                  375/240.25
2013/0208792 A1   8/2013 He et al.
                        (Continued)

FOREIGN PATENT DOCUMENTS

EP          3089451 A1      11/2016

OTHER PUBLICATIONS

Duan Y., et al., Novel Efficient HEVC Decoding Solution on General-Purpose Processors, IEEE Transactions on Multimedia, vol. 16, No. 7, Nov. 2014, pp. 1915-1928.
(Continued)

*Primary Examiner* — Tat C Chio
*Assistant Examiner* — Fabio S Lima
(74) *Attorney, Agent, or Firm* — Shumaker & Sieffert, P.A.

(57) ABSTRACT

An apparatus for coding video information according to certain aspects includes a memory unit configured to store video information associated with a plurality of layers and a processor. The processor is configured to obtain information associated with a current access unit (AU) to be coded, the current AU containing pictures from one or more layers of the plurality of layers. The processor is further configured to determine whether the current AU includes a first layer containing an intra random access point (IRAP) picture. The process is additionally configured to reset a picture order count (POC) of the second layer at the current AU, in response to determining that the current AU includes (1) a first layer that contains an IRAP picture and (2) a second layer containing no picture or containing a discardable picture.

24 Claims, 12 Drawing Sheets

(51) Int. Cl.

| | | |
|---|---|---|
| H04N 11/02 | (2006.01) | |
| H04N 11/04 | (2006.01) | |
| H04N 19/187 | (2014.01) | |
| H04N 19/31 | (2014.01) | |
| H04N 19/33 | (2014.01) | |
| H04N 13/161 | (2018.01) | |
| H04N 19/46 | (2014.01) | |
| H04N 19/30 | (2014.01) | |
| H04N 19/107 | (2014.01) | |
| H04N 19/157 | (2014.01) | |
| H04N 19/70 | (2014.01) | |
| H04W 84/04 | (2009.01) | |
| H04W 88/02 | (2009.01) | |

(52) U.S. Cl.
CPC ........... *H04N 19/157* (2014.11); *H04N 19/30* (2014.11); *H04N 19/31* (2014.11); *H04N 19/33* (2014.11); *H04N 19/46* (2014.11); *H04N 19/70* (2014.11); *H04W 84/042* (2013.01); *H04W 88/02* (2013.01)

(56) References Cited

U.S. PATENT DOCUMENTS

| | | | |
|---|---|---|---|
| 2013/0243081 A1 | 9/2013 | Chen et al. | |
| 2014/0064363 A1* | 3/2014 | Samuelsson | H04N 19/50 375/240.12 |
| 2014/0247883 A1 | 9/2014 | Lee et al. | |
| 2015/0063463 A1* | 3/2015 | Choi | H04N 19/70 375/240.25 |
| 2015/0156501 A1* | 6/2015 | Hannuksela | H04N 19/70 375/240.12 |
| 2015/0373342 A1 | 12/2015 | Hendry | |
| 2016/0088306 A1* | 3/2016 | Sjoberg | H04N 19/187 375/240.02 |

OTHER PUBLICATIONS

Hendry et al., "MV-HEVC/SHVC HLS: On POC", 18. JCT-VC Meeting; Jun. 30, 2014-Jul. 9, 2014; Sapporo; (Joint Collaborative Team on Video Coding of ISO/IEC JTC1/SC29/WG11 and ITU-T SG.16); URL: http://wftp3.itu.int/av-arch/jctvc-site/,, No. JCTVC-R0223, Jun. 21, 2014 (Jun. 21, 2014), XP030116523, pp. 7.

Sjoberg R., et al., "Overview of HEVC High-Level Syntax and Reference Picture Management," IEEE Transactions on Circuits and Systems for Video Technology, vol. 22 (12), XP011487159, Dec. 2012, pp. 1858-1870, ISSN: 1051-8215, DOI: 10.1109/TCSVT.2012.2223052.

Sullivan G.J., et al., "Overview of the High Efficiency Video Coding (HEVC) Standard", IEEE Transactions on Circuits and Systems for Video Technology, IEEE Service Center, Piscataway, NJ, US, vol. 22, No. 12, Dec. 1, 2012 (Dec. 1, 2012), pp. 1649-1668, XP011487803, ISSN: 1051-8215, DOI:10.1109/TCSVT.2012.2221191.

Wien M., "High Efficiency Video Coding—Coding Tools and Specification", in Signals and Communication Technology; Chapter 12 Extensions to HEVC, Springer-Verlag Berlin Heidelberg 2015, pp. 291-308.

Boyce J., "BoG report on SHVC/MV-HEVC HLS topics", 15. JCT-VC Meeting; Oct. 23, 2013-Nov. 1, 2013; Geneva; (Joint Collaborative Team on Video Coding of ISO/IEC JTC1/SC29/WG11 and ITU-T SG.16); URL: http://wftp3.itu.int/av-arch/jctvc-site/,, No. JCTVC-O0349-v6, Oct. 30, 2013 (Oct. 30, 2013), pp. 1-25, XP030115429.

Choi B., et al., "MV-HEVC/SHVC HLS: Alignment of picture order counts", 15. JCT-VC Meeting; Oct. 23, 2013-Nov. 1, 2013; Geneva; (Joint Collaborative Team on Video Coding of ISO/IEC JTC1/SC29/WG11 and ITU-T SG.16 ); URL: http://wftp3.itu.int/av-arch/jctvc-site/,, No. JCTVC-O0140, Oct. 15, 2013 (Oct. 15, 2013), 5 pages; XP030115154.

Hendry F., et al., "MV-HEVC/SHVC HLS: On picture order count", 16. JCT-VC Meeting; Jan. 9, 2014-Jan. 17, 2014; San Jose; (Joint Collaborative Team on Video Coding of ISO/IEC JTC1/SC29/WG11 and ITU-T SG.16); URL: http://wftp3.itu.int/av-arch/jctvc-site/,, No. JCTVC-P0041-v6, Jan. 2, 2014 (Jan. 2, 2014), XP030115502, pp. 12.

International Search Report and Written Opinion—PCT/US2015/036209—ISA/EPO—dated Aug. 28, 2015.

Ramasubramonian A.K., et al., "MV-HEVC/SHVC HLS: On picture order count," 15. JCT-VC Meeting; Oct. 23, 2013-Nov. 1, 2013; Geneva; (Joint collaborative Team on Video Coding of ISO/IEC JTC1/SC29/WG11 and ITU-T SG.16); Retrieved from the Internet URL: http://wftp3.itu.int/av-arch/jctvc-site/ Document No. JCTVC-O0213, Oct. 15, 2013 (Oct. 15, 2013), 11 pages, XP030115261.

Rapaka K., et al., "MV-HEVC/SHVC HLS: Comments on latest MV-HEVC and SHVC draft specs", 15. JCT-VC Meeting; Oct. 23, 2013-Nov. 1, 2013; Geneva; (Joint Collaborative Team on Video Coding of ISO/IEC JTC1/SC29/WG11 and ITU-T SG.16); URL: http://wftp3.itu.int/av-arch/jctvc-site/, Document No. JCTVC-O0223, Oct. 16, 2013 (Oct. 16, 2013), XP030115274; 5 pages.

Sjoberg R., et al., "HLS: Error robust POC alignment", 15. JCT-VC Meeting; Oct. 23, 2013-Nov. 1, 2013; Geneva; (Joint Collaborative Team on Video Coding of ISO/IEC JTC1/SC29/WG11 and ITU-T SG.16); URL: http://wftp3.itu.int/av-arch/jctvc-site/,, No. JCTVC-O0176, Oct. 15, 2013 (Oct. 15, 2013), 5 pages X030115208.

* cited by examiner

PICTURE ORDER COUNT RESET FOR MULTI-LAYER CODECS

INCORPORATION BY REFERENCE TO ANY PRIORITY APPLICATIONS

This application claims the benefit of U.S. Provisional Application No. 62/015,346, filed Jun. 20, 2014, which is incorporated by reference in its entirety. Any and all applications for which a foreign or domestic priority claim is identified in the Application Data Sheet as filed with the present application are hereby incorporated by reference under 37 CFR 1.57.

TECHNICAL FIELD

This disclosure relates to the field of video coding and compression, including both single-layer video coding and multi-layer video coding. Multi-layer video coding can include scalable video coding, multiview video coding, three-dimensional (3D) video coding, etc.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, and extensions of such standards. The video devices may transmit, receive, encode, decode, and/or store digital video information more efficiently by implementing such video coding techniques.

Video compression techniques perform spatial (intra-picture) prediction and/or temporal (inter-picture) prediction to reduce or remove redundancy inherent in video sequences. For block-based video coding, a video slice (e.g., a video frame, a portion of a video frame, etc.) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy encoding may be applied to achieve even more compression.

SUMMARY

The systems, methods and devices of this disclosure each have several innovative aspects, no single one of which is solely responsible for the desirable attributes disclosed herein. The details of one or more examples are set forth in the accompanying drawings and the description below, which are not intended to limit the full scope of the inventive concepts described herein. Other features, objects, and advantages will be apparent from the description and drawings, and from the claims.

Scalable video coding (SVC) refers to video coding in which a base layer (BL), sometimes referred to as a reference layer (RL), and one or more scalable enhancement layers (ELs) are used. In SVC, the base layer can carry video data with a base level of quality. The one or more enhancement layers can carry additional video data to support, for example, higher spatial, temporal, and/or signal-to-noise ratio (SNR) levels. Enhancement layers may be defined relative to a previously encoded layer. For example, a bottom layer may serve as a BL, while a top layer may serve as an EL. Middle layers may serve as either ELs or RLs, or both. For example, a middle layer (e.g., a layer that is neither the lowest layer nor the highest layer) may be an EL for the layers below the middle layer, such as the base layer or any intervening enhancement layers, and at the same time serve as a RL for one or more enhancement layers above the middle layer. Similarly, in the Multiview or 3D extension of the HEVC standard, there may be multiple views, and information of one view may be utilized to code (e.g., encode or decode) the information of another view (e.g., motion estimation, motion vector prediction and/or other redundancies).

An apparatus for coding video information according to certain aspects includes a memory unit and a processor. The memory unit is configured to store video information associated with a plurality of layers. The processor is configured to obtain information associated with a current access unit (AU) to be coded, the current AU containing pictures from one or more layers of the plurality of layers. The processor is further configured to determine whether the current AU includes a first layer containing an intra random access point (IRAP) picture. The process is additionally configured to reset a picture order count (POC) of the second layer at the current AU, in response to determining that the current AU includes (1) a first layer that contains an IRAP picture and (2) a second layer containing no picture or containing a discardable picture.

An apparatus for coding video information according to certain aspects includes a memory unit and a processor. The memory unit is configured to store video information associated with a plurality of layers. The processor is configured to obtain information associated with a current access unit (AU) to be coded, the current AU containing pictures from one or more layers of the plurality of layers. The processor is also configured to reset a picture order count (POC) of a layer included in the current AU via (1) resetting only a most significant bit (MSB) of the POC or (2) resetting both the MSB of the POC and a least significant (LSB) of the POC. The processor is further configured to, for pictures in one or more AUs subsequent to the current AU in decoding order: set a value of a first flag indicative whether a reset of the POC is a full reset.

DETAILED DESCRIPTION

Figure 1A:
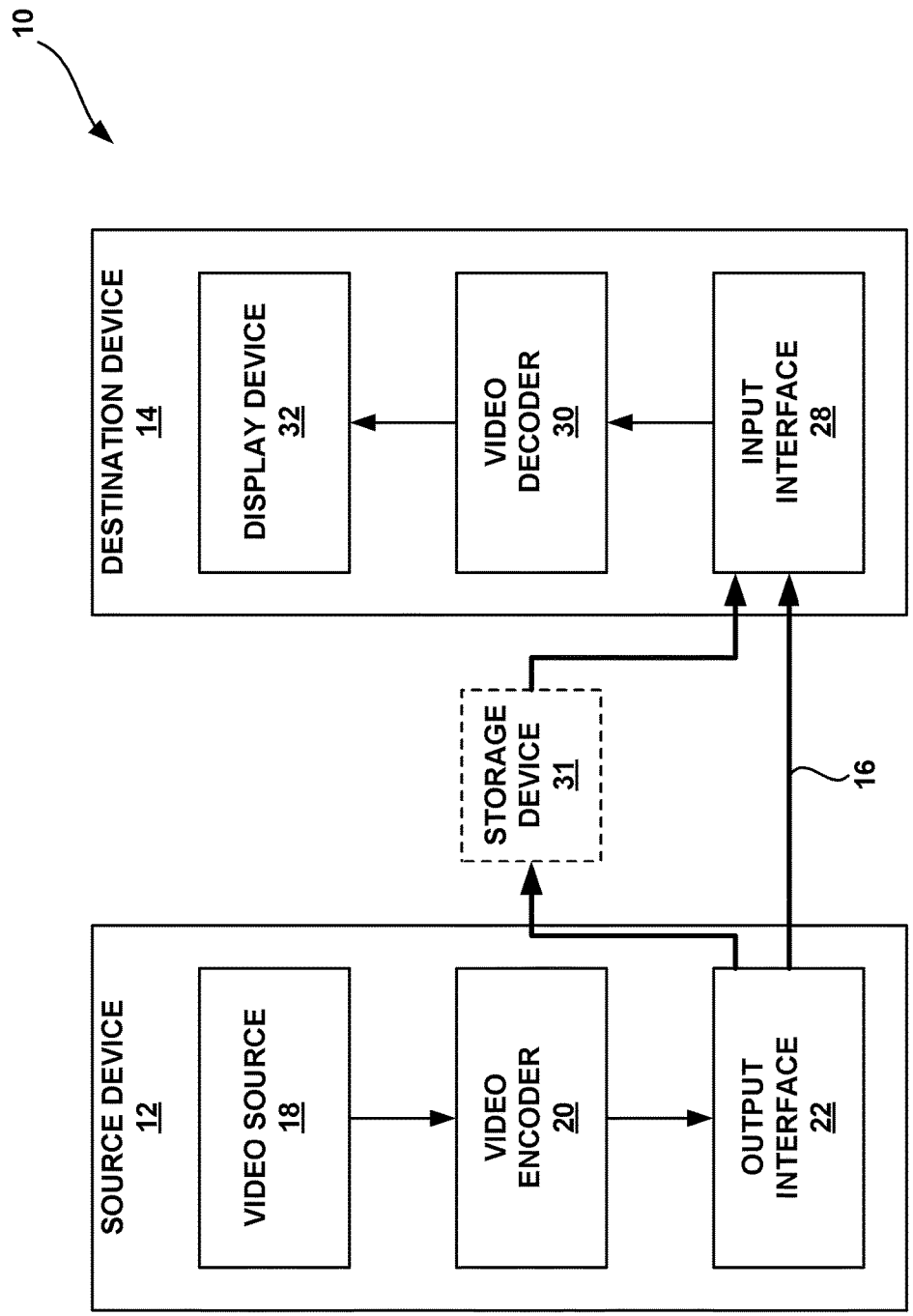
FIG. 1A is a block diagram illustrating an example video encoding and decoding system that may utilize techniques in accordance with aspects described in this disclosure.

In general, this disclosure relates to single layer coding as well as inter-layer prediction for scalable video coding in the context of advanced video codecs, such as HEVC (High Efficiency Video Coding). More specifically, the present disclosure relates to systems and methods for picture order count (POC) reset for multi-layer codecs.

In the description below, H.264/Advanced Video Coding (AVC) techniques related to certain embodiments are described; the HEVC standard and related techniques are also discussed. While certain embodiments are described herein in the context of the HEVC and/or H.264 standards, one having ordinary skill in the art may appreciate that systems and methods disclosed herein may be applicable to any suitable video coding standard. For example, embodiments disclosed herein may be applicable to one or more of the following standards: International Telecommunication Union (ITU) Telecommunication Standardization Sector (ITU-T) H.261, International Organization for Standardization (ISO) and the International Electrotechnical Commission (IEC) (ISO/IEC) Moving Picture Experts Group (MPEG) 1 (MPEG-1) Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions.

HEVC generally follows the framework of previous video coding standards in many respects. The unit of prediction in HEVC is different from the units of prediction (e.g., macroblock) in certain previous video coding standards. In fact, the concept of a macroblock does not exist in HEVC as understood in certain previous video coding standards. A macroblock is replaced by a hierarchical structure based on a quadtree scheme, which may provide high flexibility, among other possible benefits. For example, within the HEVC scheme, three types of blocks, Coding Unit (CU), Prediction Unit (PU), and Transform Unit (TU), are defined. CU may refer to the basic unit of region splitting. CU may be considered analogous to the concept of macroblock, but HEVC does not restrict the maximum size of CUs and may allow recursive splitting into four equal size CUs to improve the content adaptivity. PU may be considered the basic unit of inter/intra prediction, and a single PU may contain multiple arbitrary shape partitions to effectively code irregular image patterns. TU may be considered the basic unit of transform. TU can be defined independently from the PU; however, the size of a TU may be limited to the size of the CU to which the TU belongs. This separation of the block structure into three different concepts may allow each unit to be optimized according to the respective role of the unit, which may result in improved coding efficiency.

For purposes of illustration only, certain embodiments disclosed herein are described with examples including only two layers (e.g., a lower layer such as the base layer, and a higher layer such as the enhancement layer) of video data. A "layer" of video data may generally refer to a sequence of pictures having at least one common characteristic, such as a view, a frame rate, a resolution, or the like. For example, a layer may include video data associated with a particular view (e.g., perspective) of multi-view video data. As another example, a layer may include video data associated with a particular layer of scalable video data. Thus, this disclosure may interchangeably refer to a layer and a view of video data. That is, a view of video data may be referred to as a layer of video data, and a layer of video data may be referred to as a view of video data. In addition, a multi-layer codec (also referred to as a multi-layer video coder or multi-layer encoder-decoder) may jointly refer to a multiview codec or a scalable codec (e.g., a codec configured to encode and/or decode video data using MV-HEVC, 3D-HEVC, SHVC, or another multi-layer coding technique). Video encoding and video decoding may both generally be referred to as video coding. It should be understood that such examples may be applicable to configurations including multiple base and/or enhancement layers. In addition, for ease of explanation, the following disclosure includes the terms "frames" or "blocks" with reference to certain embodiments. However, these terms are not meant to be limiting. For example, the techniques described below can be used with any suitable video units, such as blocks (e.g., CU, PU, TU, macroblocks, etc.), slices, frames, etc.

Video Coding Standards

A digital image, such as a video image, a TV image, a still image or an image generated by a video recorder or a computer, may consist of pixels or samples arranged in horizontal and vertical lines. The number of pixels in a single image is typically in the tens of thousands. Each pixel typically contains luminance and chrominance information. Without compression, the sheer quantity of information to be conveyed from an image encoder to an image decoder would render real-time image transmission impossible. To reduce the amount of information to be transmitted, a number of different compression methods, such as JPEG, MPEG and H.263 standards, have been developed.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its SVC and MVC extensions.

In addition, a new video coding standard, namely High Efficiency Video Coding (HEVC), is being developed by the Joint Collaboration Team on Video Coding (JCT-VC) of ITU-T Video Coding Experts Group (VCEG) and ISO/IEC Moving Picture Experts Group (MPEG). The full citation for the HEVC Draft 10 is document JCTVC-L1003, Bross et al., "High Efficiency Video Coding (HEVC) Text Specification Draft 10," Joint Collaborative Team on Video Coding (JCT-VC) of ITU-T SG16 WP3 and ISO/IEC JTC1/SC29/WG11, 12th Meeting: Geneva, Switzerland, Jan. 14, 2013 to Jan. 23, 2013. The multiview extension to HEVC, namely MV-HEVC, and the scalable extension to HEVC, named SHVC, are also being developed by the JCT-3V (ITU-T/ISO/IEC Joint Collaborative Team on 3D Video Coding Extension Development) and JCT-VC, respectively.

Overview

The poc_reset_idc syntax element may indicate whether the POC should be reset for a picture. The poc_reset_idc syntax element can indicate whether the most significant bit (MSB) of the POC should be reset, or both the MSB and the least significant bit (LSB) of the POC should be reset, or none should be reset. For example, the value of 0 for the poc_reset_idc indicates that the POC is not reset. The value of 1 for the poc_reset_idc indicates that the POC MSB should be reset. The value of 2 for the poc_reset_idc indicates that both the POC MSB and LSB should be reset. The value of 3 for the poc_reset_idc indicates that reset was indicated for a previous picture. For example, the value of poc_reset_idc for the previous picture was either 1 or 2. The value of 3 for poc_reset_idc may be used such that when the picture at which the POC should be reset is lost (e.g., during the decoding process), the POC can be properly reset at subsequent pictures.

The full_poc_reset_flag can indicate whether the reset for the previous picture was only for the POC MSB, or for both the POC MSB and LSB. For instance, the value of 0 for the full_poc_reset_flag indicates that only the MSB should be reset. The value of 1 for the full_poc_reset_flag indicates that both the MSB and LSB should be reset. The full_poc_reset_flag flag can be used in connection with poc_reset_idc. For example, when the value of poc_reset_idc is 3, the full_poc_reset_flag can indicate whether the POC reset for the previous picture was for only the MSB or for both the MSB and LSB.

In early versions of SHVC and MV-HEVC (e.g., SHVC Working Draft 6, MV-HEVC Working Draft 8, etc.), certain constraints or restrictions apply, e.g., with respect to poc_reset_idc. However, these constraints do not properly reset the POC when a picture is not present or when a picture is discardable. In addition, in the early versions of SHVC and MV-HEVC, there are no restrictions on the value of full_poc_reset_flag of a picture based on poc_reset_idc of the POC resetting AU in the same POC resetting period. An incorrect value of full_poc_reset_flag may result in the POC reset mechanism not working properly.

In order to address these and other challenges, the techniques according to certain aspects reset the POC when a picture is not present (e.g., missing or absent) or when a picture is discardable. The techniques also impose a restriction on the value of full_poc_reset_flag of a picture based on the value of poc_reset_idc. In this way, the techniques can make sure that the POC is reset correctly.

Video Coding System

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the present disclosure. For example, an apparatus may be implemented or a method may be practiced using any number of the aspects set forth herein. In addition, the scope of the present disclosure is intended to cover such an apparatus or method which is practiced using other structure, functionality, or structure and functionality in addition to or other than the various aspects of the present disclosure set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The attached drawings illustrate examples. Elements indicated by reference numbers in the attached drawings correspond to elements indicated by like reference numbers in the following description. In this disclosure, elements having names that start with ordinal words (e.g., "first," "second," "third," and so on) do not necessarily imply that the elements have a particular order. Rather, such ordinal words are merely used to refer to different elements of a same or similar type.

FIG. 1A is a block diagram that illustrates an example video coding system 10 that may utilize techniques in accordance with aspects described in this disclosure. As used described herein, the term "video coder" refers generically to both video encoders and video decoders. In this disclosure, the terms "video coding" or "coding" may refer generically to video encoding and video decoding. In addition to video encoders and video decoders, the aspects described in the present application may be extended to other related devices such as transcoders (e.g., devices that can decode a bitstream and re-encode another bitstream) and middleboxes (e.g., devices that can modify, transform, and/or otherwise manipulate a bitstream).

Figure 1B:
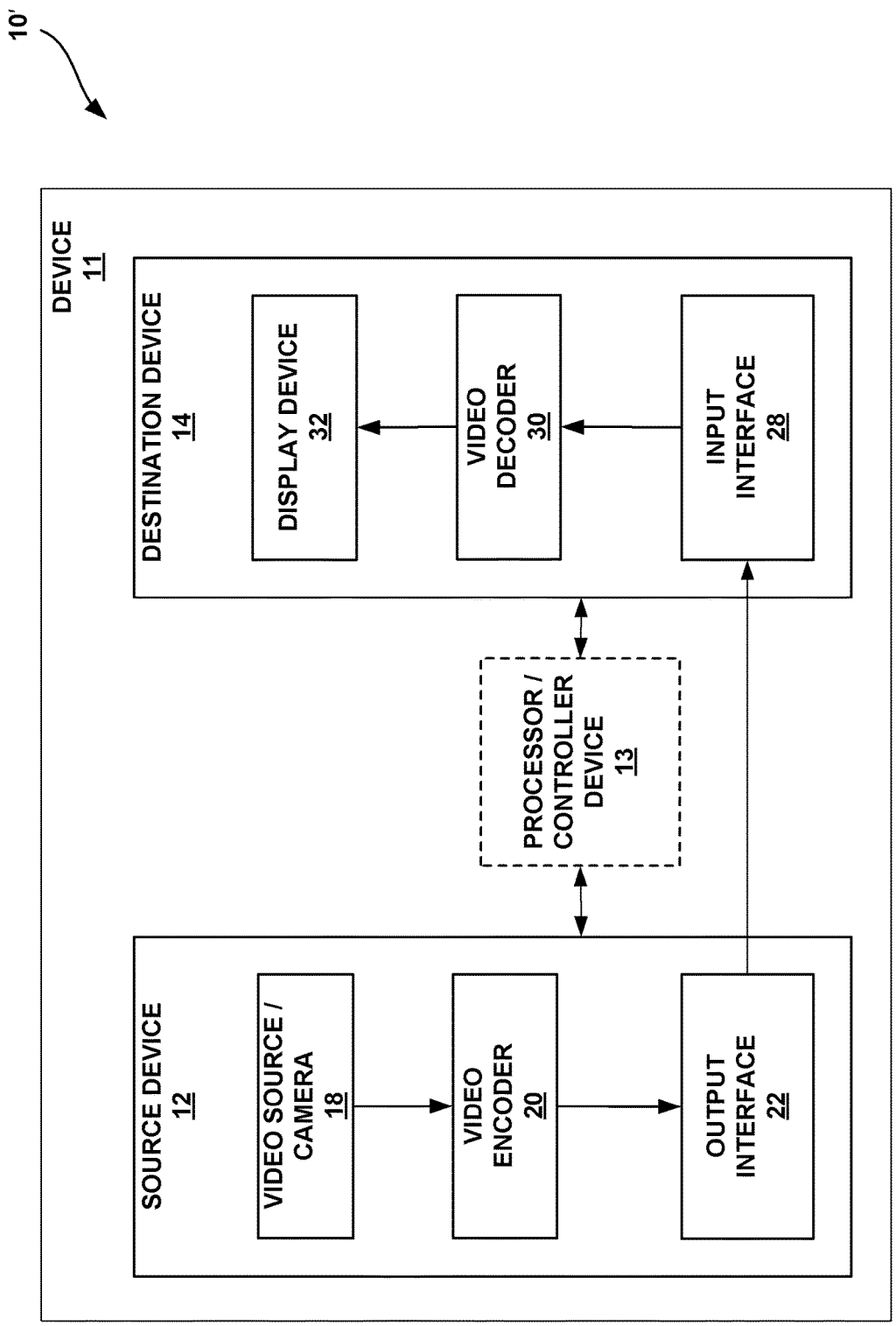
FIG. 1B is a block diagram illustrating another example video encoding and decoding system that may perform techniques in accordance with aspects described in this disclosure.

As shown in FIG. 1A, video coding system 10 includes a source device 12 that generates encoded video data to be decoded at a later time by a destination device 14. In the example of FIG. 1A, the source device 12 and destination device 14 constitute separate devices. It is noted, however, that the source and destination devices 12, 14 may be on or part of the same device, as shown in the example of FIG. 1B.

With reference once again, to FIG. 1A, the source device 12 and the destination device 14 may respectively comprise any of a wide range of devices, including desktop computers, notebook (e.g., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device 12 and the destination device 14 may be equipped for wireless communication.

The destination device 14 may receive, via link 16, the encoded video data to be decoded. The link 16 may comprise any type of medium or device capable of moving the encoded video data from the source device 12 to the destination device 14. In the example of FIG. 1A, the link 16 may comprise a communication medium to enable the source device 12 to transmit encoded video data to the destination device 14 in real-time. The encoded video data may be modulated according to a communication standard, such as a wireless communication protocol, and transmitted to the destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device 12 to the destination device 14.

Alternatively, encoded data may be output from an output interface 22 to an optional storage device 31. Similarly, encoded data may be accessed from the storage device 31 by an input interface 28, for example, of the destination device 14. The storage device 31 may include any of a variety of distributed or locally accessed data storage media such as a hard drive, flash memory, volatile or non-volatile memory, or any other suitable digital storage media for storing encoded video data. In a further example, the storage device 31 may correspond to a file server or another intermediate storage device that may hold the encoded video generated by the source device 12. The destination device 14 may access stored video data from the storage device 31 via streaming or download. The file server may be any type of server capable of storing encoded video data and transmitting that encoded video data to the destination device 14. Example file servers include a web server (e.g., for a website), a File Transfer Protocol (FTP) server, network attached storage (NAS) devices, or a local disk drive. The destination device 14 may access the encoded video data through any standard data connection, including an Internet connection. This may include a wireless channel (e.g., a wireless local area network (WLAN) connection), a wired connection (e.g., a digital subscriber line (DSL), a cable modem, etc.), or a combination of both that is suitable for accessing encoded video data stored on a file server. The transmission of encoded video data from the storage device 31 may be a streaming transmission, a download transmission, or a combination of both.

The techniques of this disclosure are not limited to wireless applications or settings. The techniques may be applied to video coding in support of any of a variety of multimedia applications, such as over-the-air television broadcasts, cable television transmissions, satellite television transmissions, streaming video transmissions, e.g., via the Internet (e.g., dynamic adaptive streaming over Hypertext Transfer Protocol (HTTP), etc.), encoding of digital video for storage on a data storage medium, decoding of digital video stored on a data storage medium, or other applications. In some examples, video coding system 10 may be configured to support one-way or two-way video transmission to support applications such as video streaming, video playback, video broadcasting, and/or video telephony.

In the example of FIG. 1A, the source device 12 includes a video source 18, a video encoder 20 and the output interface 22. In some cases, the output interface 22 may include a modulator/demodulator (modem) and/or a transmitter. In the source device 12, the video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if the video source 18 is a video camera, the source device 12 and the destination device 14 may form so-called "camera phones" or "video phones," as illustrated in the example of FIG. 1B. However, the techniques described in this disclosure may be applicable to video coding in general, and may be applied to wireless and/or wired applications.

The captured, pre-captured, or computer-generated video may be encoded by the video encoder 20. The encoded video data may be transmitted to the destination device 14 via the output interface 22 of the source device 12. The encoded video data may also (or alternatively) be stored onto the storage device 31 for later access by the destination device 14 or other devices, for decoding and/or playback. The video encoder 20 illustrated in FIGS. 1A and 1B may comprise the video encoder 20 illustrated FIG. 2A, the video encoder 23 illustrated in FIG. 2B, or any other video encoder described herein.

In the example of FIG. 1A, the destination device 14 includes an input interface 28, a video decoder 30, and a display device 32. In some cases, the input interface 28 may include a receiver and/or a modem. The input interface 28 of the destination device 14 may receive the encoded video data over the link 16 and/or from the storage device 31. The encoded video data communicated over the link 16, or provided on the storage device 31, may include a variety of syntax elements generated by the video encoder 20 for use by a video decoder, such as the video decoder 30, in decoding the video data. Such syntax elements may be included with the encoded video data transmitted on a communication medium, stored on a storage medium, or stored a file server. The video decoder 30 illustrated in FIGS. 1A and 1B may comprise the video decoder 30 illustrated FIG. 3A, the video decoder 33 illustrated in FIG. 3B, or any other video decoder described herein.

The display device 32 may be integrated with, or external to, the destination device 14. In some examples, the destination device 14 may include an integrated display device and also be configured to interface with an external display device. In other examples, the destination device 14 may be a display device. In general, the display device 32 displays the decoded video data to a user, and may comprise any of a variety of display devices such as a liquid crystal display (LCD), a plasma display, an organic light emitting diode (OLED) display, or another type of display device.

In related aspects, FIG. 1B shows an example video encoding and decoding system 10' wherein the source and destination devices 12, 14 are on or part of a device 11. The device 11 may be a telephone handset, such as a "smart" phone or the like. The device 11 may include an optional controller/processor device 13 in operative communication with the source and destination devices 12, 14. The system 10' of FIG. 1B, and components thereof, are otherwise similar to the system 10 of FIG. 1A, and components thereof.

The video encoder 20 and the video decoder 30 may operate according to a video compression standard, such as the HEVC, and may conform to a HEVC Test Model (HM). Alternatively, the video encoder 20 and video decoder 30 may operate according to other proprietary or industry standards, such as the ITU-T H.264 standard, alternatively referred to as MPEG-4, Part 10, AVC, or extensions of such standards. The techniques of this disclosure, however, are not limited to any particular coding standard. Other examples of video compression standards include MPEG-2 and ITU-T H.263.

Although not shown in the examples of FIGS. 1A and 1B, the video encoder 20 and the video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

The video encoder 20 and the video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of the video encoder 20 and the video decoder 30 may be included in one or more encoders or decoders, either of which may be integrated as part of a combined encoder/decoder (CODEC) in a respective device.

Video Coding Process

As mentioned briefly above, the video encoder 20 encodes video data. The video data may comprise one or more pictures. Each of the pictures is a still image forming part of a video. In some instances, a picture may be referred to as a video "frame." When the video encoder 20 encodes the video data, the video encoder 20 may generate a bitstream. The bitstream may include a sequence of bits that form a coded representation of the video data. The bitstream may include coded pictures and associated data. A coded picture is a coded representation of a picture.

To generate the bitstream, the video encoder 20 may perform encoding operations on each picture in the video data. When the video encoder 20 performs encoding operations on the pictures, the video encoder 20 may generate a series of coded pictures and associated data. The associated data may include video parameter sets (VPS), sequence parameter sets (SPSs), picture parameter sets (PPSs), adaptation parameter sets (APSs), and other syntax structures. A SPS may contain parameters applicable to zero or more sequences of pictures. A PPS may contain parameters applicable to zero or more pictures. An APS may contain parameters applicable to zero or more pictures. Parameters in an APS may be parameters that are more likely to change than parameters in a PPS.

To generate a coded picture, the video encoder 20 may partition a picture into equally-sized video blocks. A video block may be a two-dimensional array of samples. Each of the video blocks is associated with a treeblock. In some instances, a treeblock may be referred to as a largest coding unit (LCU). The treeblocks of HEVC may be broadly analogous to the macroblocks of previous standards, such as H.264/AVC. However, a treeblock is not necessarily limited to a particular size and may include one or more coding units (CUs). The video encoder 20 may use quadtree partitioning to partition the video blocks of treeblocks into video blocks associated with CUs, hence the name "treeblocks."

In some examples, the video encoder 20 may partition a picture into a plurality of slices. Each of the slices may include an integer number of CUs. In some instances, a slice comprises an integer number of treeblocks. In other instances, a boundary of a slice may be within a treeblock.

As part of performing an encoding operation on a picture, the video encoder 20 may perform encoding operations on each slice of the picture. When the video encoder 20 performs an encoding operation on a slice, the video encoder 20 may generate encoded data associated with the slice. The encoded data associated with the slice may be referred to as a "coded slice."

To generate a coded slice, the video encoder 20 may perform encoding operations on each treeblock in a slice. When the video encoder 20 performs an encoding operation on a treeblock, the video encoder 20 may generate a coded treeblock. The coded treeblock may comprise data representing an encoded version of the treeblock.

When the video encoder 20 generates a coded slice, the video encoder 20 may perform encoding operations on (e.g., encode) the treeblocks in the slice according to a raster scan order. For example, the video encoder 20 may encode the treeblocks of the slice in an order that proceeds from left to right across a topmost row of treeblocks in the slice, then from left to right across a next lower row of treeblocks, and so on until the video encoder 20 has encoded each of the treeblocks in the slice.

As a result of encoding the treeblocks according to the raster scan order, the treeblocks above and to the left of a given treeblock may have been encoded, but treeblocks below and to the right of the given treeblock have not yet been encoded. Consequently, the video encoder 20 may be able to access information generated by encoding treeblocks above and to the left of the given treeblock when encoding the given treeblock. However, the video encoder 20 may be unable to access information generated by encoding treeblocks below and to the right of the given treeblock when encoding the given treeblock.

To generate a coded treeblock, the video encoder 20 may recursively perform quadtree partitioning on the video block of the treeblock to divide the video block into progressively smaller video blocks. Each of the smaller video blocks may be associated with a different CU. For example, the video encoder 20 may partition the video block of a treeblock into four equally-sized sub-blocks, partition one or more of the sub-blocks into four equally-sized sub-sub-blocks, and so on. A partitioned CU may be a CU whose video block is partitioned into video blocks associated with other CUs. A non-partitioned CU may be a CU whose video block is not partitioned into video blocks associated with other CUs.

One or more syntax elements in the bitstream may indicate a maximum number of times the video encoder 20 may partition the video block of a treeblock. A video block of a CU may be square in shape. The size of the video block of a CU (e.g., the size of the CU) may range from 8×8 pixels up to the size of a video block of a treeblock (e.g., the size of the treeblock) with a maximum of 64×64 pixels or greater.

The video encoder 20 may perform encoding operations on (e.g., encode) each CU of a treeblock according to a z-scan order. In other words, the video encoder 20 may encode a top-left CU, a top-right CU, a bottom-left CU, and then a bottom-right CU, in that order. When the video encoder 20 performs an encoding operation on a partitioned CU, the video encoder 20 may encode CUs associated with sub-blocks of the video block of the partitioned CU according to the z-scan order. In other words, the video encoder 20 may encode a CU associated with a top-left sub-block, a CU associated with a top-right sub-block, a CU associated with a bottom-left sub-block, and then a CU associated with a bottom-right sub-block, in that order.

As a result of encoding the CUs of a treeblock according to a z-scan order, the CUs above, above-and-to-the-left, above-and-to-the-right, left, and below-and-to-the left of a given CU may have been encoded. CUs below and to the right of the given CU have not yet been encoded. Consequently, the video encoder 20 may be able to access information generated by encoding some CUs that neighbor the given CU when encoding the given CU. However, the video encoder 20 may be unable to access information generated by encoding other CUs that neighbor the given CU when encoding the given CU.

When the video encoder 20 encodes a non-partitioned CU, the video encoder 20 may generate one or more prediction units (PUs) for the CU. Each of the PUs of the CU may be associated with a different video block within the video block of the CU. The video encoder 20 may generate a predicted video block for each PU of the CU. The predicted video block of a PU may be a block of samples. The video encoder 20 may use intra prediction or inter prediction to generate the predicted video block for a PU.

When the video encoder 20 uses intra prediction to generate the predicted video block of a PU, the video encoder 20 may generate the predicted video block of the PU based on decoded samples of the picture associated with the PU. If the video encoder 20 uses intra prediction to generate predicted video blocks of the PUs of a CU, the CU is an intra-predicted CU. When the video encoder 20 uses inter prediction to generate the predicted video block of the PU, the video encoder 20 may generate the predicted video block of the PU based on decoded samples of one or more pictures other than the picture associated with the PU. If the video encoder 20 uses inter prediction to generate predicted video blocks of the PUs of a CU, the CU is an inter-predicted CU.

Furthermore, when the video encoder 20 uses inter prediction to generate a predicted video block for a PU, the video encoder 20 may generate motion information for the PU. The motion information for a PU may indicate one or more reference blocks of the PU. Each reference block of the PU may be a video block within a reference picture. The reference picture may be a picture other than the picture associated with the PU. In some instances, a reference block of a PU may also be referred to as the "reference sample" of the PU. The video encoder 20 may generate the predicted video block for the PU based on the reference blocks of the PU.

After the video encoder 20 generates predicted video blocks for one or more PUs of a CU, the video encoder 20 may generate residual data for the CU based on the predicted video blocks for the PUs of the CU. The residual data for the CU may indicate differences between samples in the predicted video blocks for the PUs of the CU and the original video block of the CU.

Furthermore, as part of performing an encoding operation on a non-partitioned CU, the video encoder 20 may perform recursive quadtree partitioning on the residual data of the CU to partition the residual data of the CU into one or more blocks of residual data (e.g., residual video blocks) associated with transform units (TUs) of the CU. Each TU of a CU may be associated with a different residual video block.

The video encoder 20 may apply one or more transforms to residual video blocks associated with the TUs to generate transform coefficient blocks (e.g., blocks of transform coefficients) associated with the TUs. Conceptually, a transform coefficient block may be a two-dimensional (2D) matrix of transform coefficients.

After generating a transform coefficient block, the video encoder 20 may perform a quantization process on the transform coefficient block. Quantization generally refers to a process in which transform coefficients are quantized to possibly reduce the amount of data used to represent the transform coefficients, providing further compression. The quantization process may reduce the bit depth associated with some or all of the transform coefficients. For example, an n-bit transform coefficient may be rounded down to an m-bit transform coefficient during quantization, where n is greater than m.

The video encoder 20 may associate each CU with a quantization parameter (QP) value. The QP value associated with a CU may determine how the video encoder 20 quantizes transform coefficient blocks associated with the CU. The video encoder 20 may adjust the degree of quantization applied to the transform coefficient blocks associated with a CU by adjusting the QP value associated with the CU.

After the video encoder 20 quantizes a transform coefficient block, the video encoder 20 may generate sets of syntax elements that represent the transform coefficients in the quantized transform coefficient block. The video encoder 20 may apply entropy encoding operations, such as Context Adaptive Binary Arithmetic Coding (CABAC) operations, to some of these syntax elements. Other entropy coding techniques such as context adaptive variable length coding (CAVLC), probability interval partitioning entropy (PIPE) coding, or other binary arithmetic coding could also be used.

The bitstream generated by the video encoder 20 may include a series of Network Abstraction Layer (NAL) units. Each of the NAL units may be a syntax structure containing an indication of a type of data in the NAL unit and bytes containing the data. For example, a NAL unit may contain data representing a video parameter set, a sequence parameter set, a picture parameter set, a coded slice, supplemental enhancement information (SEI), an access unit delimiter, filler data, or another type of data. The data in a NAL unit may include various syntax structures.

The video decoder 30 may receive the bitstream generated by the video encoder 20. The bitstream may include a coded representation of the video data encoded by the video encoder 20. When the video decoder 30 receives the bitstream, the video decoder 30 may perform a parsing operation on the bitstream. When the video decoder 30 performs the parsing operation, the video decoder 30 may extract syntax elements from the bitstream. The video decoder 30 may reconstruct the pictures of the video data based on the syntax elements extracted from the bitstream. The process to reconstruct the video data based on the syntax elements may be generally reciprocal to the process performed by the video encoder 20 to generate the syntax elements.

After the video decoder 30 extracts the syntax elements associated with a CU, the video decoder 30 may generate predicted video blocks for the PUs of the CU based on the syntax elements. In addition, the video decoder 30 may inverse quantize transform coefficient blocks associated with TUs of the CU. The video decoder 30 may perform inverse transforms on the transform coefficient blocks to reconstruct residual video blocks associated with the TUs of the CU. After generating the predicted video blocks and reconstructing the residual video blocks, the video decoder 30 may reconstruct the video block of the CU based on the predicted video blocks and the residual video blocks. In this way, the video decoder 30 may reconstruct the video blocks of CUs based on the syntax elements in the bitstream.

Video Encoder

Figure 2A:
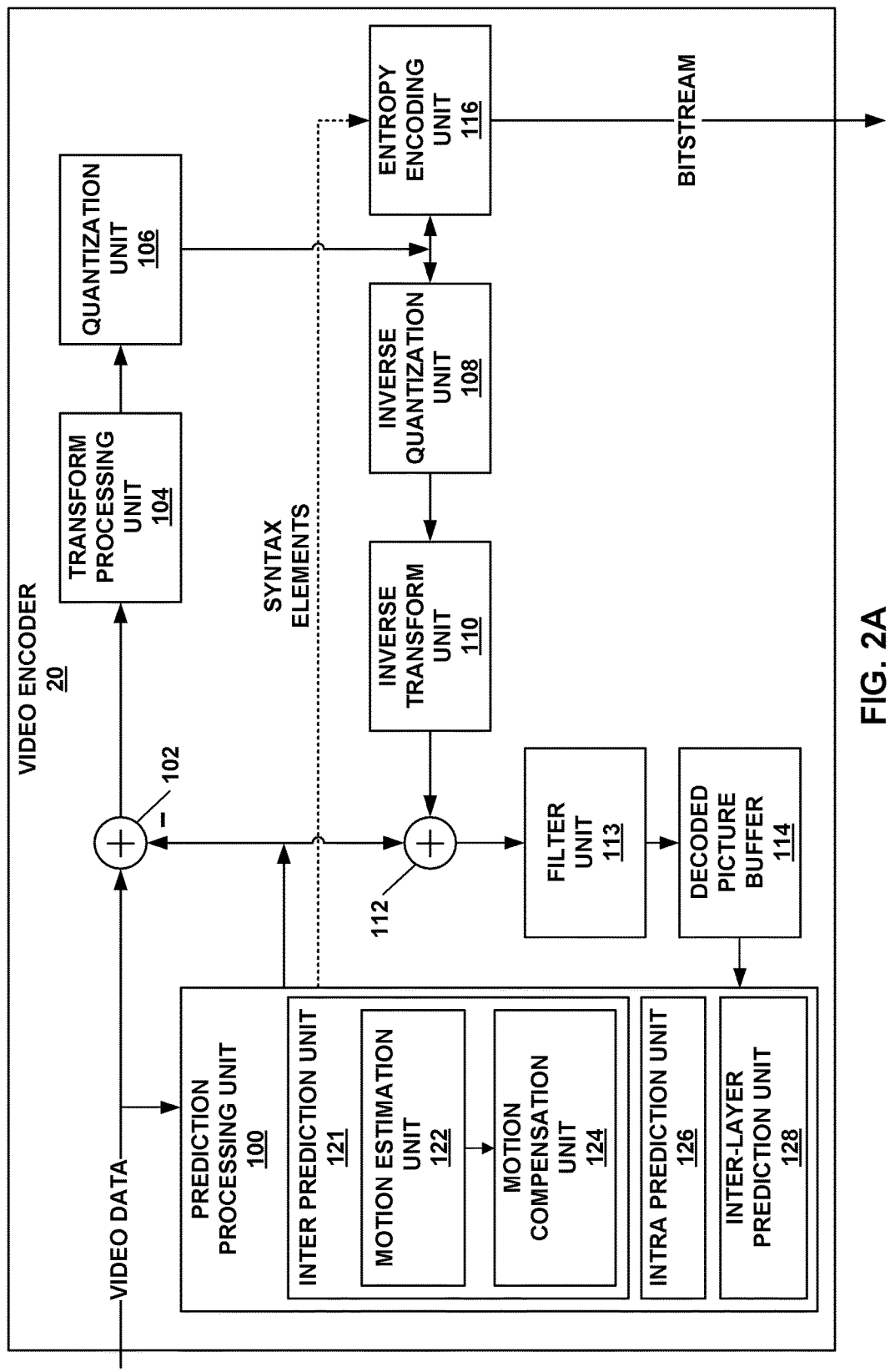
FIG. 2A is a block diagram illustrating an example of a video encoder that may implement techniques in accordance with aspects described in this disclosure.

FIG. 2A is a block diagram illustrating an example of the video encoder 20 that may implement techniques in accordance with aspects described in this disclosure. The video encoder 20 may be configured to process a single layer of a video frame, such as for HEVC. Further, the video encoder 20 may be configured to perform any or all of the techniques of this disclosure, including but not limited to the methods of inferring NoOutputOfPriorPicsFlag and related processes described in greater detail above and below with respect to FIGS. 4 and 5. As one example, prediction processing unit 100 may be configured to perform any or all of the techniques described in this disclosure. In another embodiment, the video encoder 20 includes an optional inter-layer prediction unit 128 that is configured to perform any or all of the techniques described in this disclosure. In other embodiments, inter-layer prediction can be performed by prediction processing unit 100 (e.g., inter prediction unit 121 and/or intra prediction unit 126), in which case the inter-layer prediction unit 128 may be omitted. However, aspects of this disclosure are not so limited. In some examples, the techniques described in this disclosure may be shared among the various components of the video encoder 20. In some examples, additionally or alternatively, a processor (not shown) may be configured to perform any or all of the techniques described in this disclosure.

For purposes of explanation, this disclosure describes the video encoder 20 in the context of HEVC coding. However, the techniques of this disclosure may be applicable to other coding standards or methods. The example depicted in FIG. 2A is for a single layer codec. However, as will be described further with respect to FIG. 2B, some or all of the video encoder 20 may be duplicated for processing of a multi-layer codec.

The video encoder 20 may perform intra- and inter-coding of video blocks within video slices. Intra coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-directional prediction (B mode), may refer to any of several temporal-based coding modes.

In the example of FIG. 2A, the video encoder 20 includes a plurality of functional components. The functional components of the video encoder 20 include a prediction processing unit 100, a residual generation unit 102, a transform processing unit 104, a quantization unit 106, an inverse quantization unit 108, an inverse transform unit 110, a reconstruction unit 112, a filter unit 113, a decoded picture buffer 114, and an entropy encoding unit 116. Prediction processing unit 100 includes an inter prediction unit 121, a motion estimation unit 122, a motion compensation unit 124, an intra prediction unit 126, and an inter-layer prediction unit 128. In other examples, the video encoder 20 may include more, fewer, or different functional components. Furthermore, motion estimation unit 122 and motion compensation unit 124 may be highly integrated, but are represented in the example of FIG. 2A separately for purposes of explanation.

The video encoder 20 may receive video data. The video encoder 20 may receive the video data from various sources. For example, the video encoder 20 may receive the video data from video source 18 (e.g., shown in FIG. 1A or 1B) or another source. The video data may represent a series of pictures. To encode the video data, the video encoder 20 may perform an encoding operation on each of the pictures. As part of performing the encoding operation on a picture, the video encoder 20 may perform encoding operations on each slice of the picture. As part of performing an encoding operation on a slice, the video encoder 20 may perform encoding operations on treeblocks in the slice.

As part of performing an encoding operation on a treeblock, prediction processing unit 100 may perform quadtree partitioning on the video block of the treeblock to divide the video block into progressively smaller video blocks. Each of the smaller video blocks may be associated with a different CU. For example, prediction processing unit 100 may partition a video block of a treeblock into four equally-sized sub-blocks, partition one or more of the sub-blocks into four equally-sized sub-sub-blocks, and so on.

The sizes of the video blocks associated with CUs may range from 8×8 samples up to the size of the treeblock with a maximum of 64×64 samples or greater. In this disclosure, "N×N" and "N by N" may be used interchangeably to refer to the sample dimensions of a video block in terms of vertical and horizontal dimensions, e.g., 16×16 samples or 16 by 16 samples. In general, a 16×16 video block has sixteen samples in a vertical direction (y=16) and sixteen samples in a horizontal direction (x=16). Likewise, an N×N block generally has N samples in a vertical direction and N samples in a horizontal direction, where N represents a nonnegative integer value.

Furthermore, as part of performing the encoding operation on a treeblock, prediction processing unit 100 may generate a hierarchical quadtree data structure for the treeblock. For example, a treeblock may correspond to a root node of the quadtree data structure. If prediction processing unit 100 partitions the video block of the treeblock into four sub-blocks, the root node has four child nodes in the quadtree data structure. Each of the child nodes corresponds to a CU associated with one of the sub-blocks. If prediction processing unit 100 partitions one of the sub-blocks into four sub-sub-blocks, the node corresponding to the CU associated with the sub-block may have four child nodes, each of which corresponds to a CU associated with one of the sub-sub-blocks.

Each node of the quadtree data structure may contain syntax data (e.g., syntax elements) for the corresponding treeblock or CU. For example, a node in the quadtree may include a split flag that indicates whether the video block of the CU corresponding to the node is partitioned (e.g., split) into four sub-blocks. Syntax elements for a CU may be defined recursively, and may depend on whether the video block of the CU is split into sub-blocks. A CU whose video block is not partitioned may correspond to a leaf node in the quadtree data structure. A coded treeblock may include data based on the quadtree data structure for a corresponding treeblock.

The video encoder 20 may perform encoding operations on each non-partitioned CU of a treeblock. When the video encoder 20 performs an encoding operation on a non-partitioned CU, the video encoder 20 generates data representing an encoded representation of the non-partitioned CU.

As part of performing an encoding operation on a CU, prediction processing unit 100 may partition the video block of the CU among one or more PUs of the CU. The video encoder 20 and the video decoder 30 may support various PU sizes. Assuming that the size of a particular CU is 2N×2N, the video encoder 20 and the video decoder 30 may support PU sizes of 2N×2N or N×N, and inter-prediction in symmetric PU sizes of 2N×2N, 2N×N, N×2N, N×N, 2N×nU, nL×2N, nR×2N, or similar. The video encoder 20 and the video decoder 30 may also support asymmetric partitioning for PU sizes of 2N×nU, 2N×nD, nL×2N, and nR×2N. In some examples, prediction processing unit 100 may perform geometric partitioning to partition the video block of a CU among PUs of the CU along a boundary that does not meet the sides of the video block of the CU at right angles.

Inter prediction unit 121 may perform inter prediction on each PU of the CU. Inter prediction may provide temporal compression. To perform inter prediction on a PU, motion estimation unit 122 may generate motion information for the PU. Motion compensation unit 124 may generate a predicted video block for the PU based the motion information and decoded samples of pictures other than the picture associated with the CU (e.g., reference pictures). In this disclosure, a predicted video block generated by motion compensation unit 124 may be referred to as an inter-predicted video block.

Slices may be I slices, P slices, or B slices. Motion estimation unit 122 and motion compensation unit 124 may perform different operations for a PU of a CU depending on whether the PU is in an I slice, a P slice, or a B slice. In an I slice, all PUs are intra predicted. Hence, if the PU is in an I slice, motion estimation unit 122 and motion compensation unit 124 do not perform inter prediction on the PU.

If the PU is in a P slice, the picture containing the PU is associated with a list of reference pictures referred to as "list 0." Each of the reference pictures in list 0 contains samples that may be used for inter prediction of other pictures. When motion estimation unit 122 performs the motion estimation operation with regard to a PU in a P slice, motion estimation unit 122 may search the reference pictures in list 0 for a reference block for the PU. The reference block of the PU may be a set of samples, e.g., a block of samples, that most closely corresponds to the samples in the video block of the PU. Motion estimation unit 122 may use a variety of metrics to determine how closely a set of samples in a reference picture corresponds to the samples in the video block of a PU. For example, motion estimation unit 122 may determine how closely a set of samples in a reference picture corresponds to the samples in the video block of a PU by sum of absolute difference (SAD), sum of square difference (SSD), or other difference metrics.

After identifying a reference block of a PU in a P slice, motion estimation unit 122 may generate a reference index that indicates the reference picture in list 0 containing the reference block and a motion vector that indicates a spatial displacement between the PU and the reference block. In various examples, motion estimation unit 122 may generate motion vectors to varying degrees of precision. For example, motion estimation unit 122 may generate motion vectors at one-quarter sample precision, one-eighth sample precision, or other fractional sample precision. In the case of fractional sample precision, reference block values may be interpolated from integer-position sample values in the reference picture. Motion estimation unit 122 may output the reference index and the motion vector as the motion information of the PU. Motion compensation unit 124 may generate a predicted video block of the PU based on the reference block identified by the motion information of the PU.

If the PU is in a B slice, the picture containing the PU may be associated with two lists of reference pictures, referred to as "list 0" and "list 1." In some examples, a picture containing a B slice may be associated with a list combination that is a combination of list 0 and list 1.

Furthermore, if the PU is in a B slice, motion estimation unit 122 may perform uni-directional prediction or bi-directional prediction for the PU. When motion estimation unit 122 performs uni-directional prediction for the PU, motion estimation unit 122 may search the reference pictures of list 0 or list 1 for a reference block for the PU. Motion estimation unit 122 may then generate a reference index that indicates the reference picture in list 0 or list 1 that contains the reference block and a motion vector that indicates a spatial displacement between the PU and the reference block. Motion estimation unit 122 may output the reference index, a prediction direction indicator, and the motion vector as the motion information of the PU. The prediction direction indicator may indicate whether the reference index indicates a reference picture in list 0 or list 1. Motion compensation unit 124 may generate the predicted video block of the PU based on the reference block indicated by the motion information of the PU.

When motion estimation unit 122 performs bi-directional prediction for a PU, motion estimation unit 122 may search the reference pictures in list 0 for a reference block for the PU and may also search the reference pictures in list 1 for another reference block for the PU. Motion estimation unit 122 may then generate reference indexes that indicate the reference pictures in list 0 and list 1 containing the reference blocks and motion vectors that indicate spatial displacements between the reference blocks and the PU. Motion estimation unit 122 may output the reference indexes and the motion vectors of the PU as the motion information of the PU. Motion compensation unit 124 may generate the predicted video block of the PU based on the reference blocks indicated by the motion information of the PU.

In some instances, motion estimation unit 122 does not output a full set of motion information for a PU to entropy encoding unit 116. Rather, motion estimation unit 122 may signal the motion information of a PU with reference to the motion information of another PU. For example, motion estimation unit 122 may determine that the motion information of the PU is sufficiently similar to the motion information of a neighboring PU. In this example, motion estimation unit 122 may indicate, in a syntax structure associated with the PU, a value that indicates to the video decoder 30 that the PU has the same motion information as the neighboring PU. In another example, motion estimation unit 122 may identify, in a syntax structure associated with the PU, a neighboring PU and a motion vector difference (MVD). The motion vector difference indicates a difference between the motion vector of the PU and the motion vector of the indicated neighboring PU. The video decoder 30 may use the motion vector of the indicated neighboring PU and the motion vector difference to determine the motion vector of the PU. By referring to the motion information of a first PU when signaling the motion information of a second PU, the video encoder 20 may be able to signal the motion information of the second PU using fewer bits.

As further discussed below with reference to FIGS. 8-9, the prediction processing unit 100 may be configured to code (e.g., encode or decode) the PU (or any other reference layer and/or enhancement layer blocks or video units) by performing the methods illustrated in FIGS. 8-9. For example, inter prediction unit 121 (e.g., via motion estimation unit 122 and/or motion compensation unit 124), intra prediction unit 126, or inter-layer prediction unit 128 may be configured to perform the methods illustrated in FIGS. 8-9, either together or separately.

As part of performing an encoding operation on a CU, intra prediction unit 126 may perform intra prediction on PUs of the CU. Intra prediction may provide spatial compression. When intra prediction unit 126 performs intra prediction on a PU, intra prediction unit 126 may generate prediction data for the PU based on decoded samples of other PUs in the same picture. The prediction data for the PU may include a predicted video block and various syntax elements. Intra prediction unit 126 may perform intra prediction on PUs in I slices, P slices, and B slices.

To perform intra prediction on a PU, intra prediction unit 126 may use multiple intra prediction modes to generate multiple sets of prediction data for the PU. When intra prediction unit 126 uses an intra prediction mode to generate a set of prediction data for the PU, intra prediction unit 126 may extend samples from video blocks of neighboring PUs across the video block of the PU in a direction and/or gradient associated with the intra prediction mode. The neighboring PUs may be above, above and to the right, above and to the left, or to the left of the PU, assuming a left-to-right, top-to-bottom encoding order for PUs, CUs, and treeblocks. Intra prediction unit 126 may use various numbers of intra prediction modes, e.g., 33 directional intra prediction modes, depending on the size of the PU.

Prediction processing unit 100 may select the prediction data for a PU from among the prediction data generated by motion compensation unit 124 for the PU or the prediction data generated by intra prediction unit 126 for the PU. In some examples, prediction processing unit 100 selects the prediction data for the PU based on rate/distortion metrics of the sets of prediction data.

If prediction processing unit 100 selects prediction data generated by intra prediction unit 126, prediction processing unit 100 may signal the intra prediction mode that was used to generate the prediction data for the PUs, e.g., the selected intra prediction mode. Prediction processing unit 100 may signal the selected intra prediction mode in various ways. For example, it may be probable that the selected intra prediction mode is the same as the intra prediction mode of a neighboring PU. In other words, the intra prediction mode of the neighboring PU may be the most probable mode for the current PU. Thus, prediction processing unit 100 may generate a syntax element to indicate that the selected intra prediction mode is the same as the intra prediction mode of the neighboring PU.

As discussed above, the video encoder 20 may include inter-layer prediction unit 128. Inter-layer prediction unit 128 is configured to predict a current block (e.g., a current block in the EL) using one or more different layers that are available in SVC (e.g., a base or reference layer). Such prediction may be referred to as inter-layer prediction. Inter-layer prediction unit 128 utilizes prediction methods to reduce inter-layer redundancy, thereby improving coding efficiency and reducing computational resource requirements. Some examples of inter-layer prediction include inter-layer intra prediction, inter-layer motion prediction, and inter-layer residual prediction. Inter-layer intra prediction uses the reconstruction of co-located blocks in the base layer to predict the current block in the enhancement layer. Inter-layer motion prediction uses motion information of the base layer to predict motion in the enhancement layer. Inter-layer residual prediction uses the residue of the base layer to predict the residue of the enhancement layer. Each of the inter-layer prediction schemes is discussed below in greater detail.

After prediction processing unit 100 selects the prediction data for PUs of a CU, residual generation unit 102 may generate residual data for the CU by subtracting (e.g., indicated by the minus sign) the predicted video blocks of the PUs of the CU from the video block of the CU. The residual data of a CU may include 2D residual video blocks that correspond to different sample components of the samples in the video block of the CU. For example, the residual data may include a residual video block that corresponds to differences between luminance components of samples in the predicted video blocks of the PUs of the CU and luminance components of samples in the original video block of the CU. In addition, the residual data of the CU may include residual video blocks that correspond to the differences between chrominance components of samples in the predicted video blocks of the PUs of the CU and the chrominance components of the samples in the original video block of the CU.

Prediction processing unit 100 may perform quadtree partitioning to partition the residual video blocks of a CU into sub-blocks. Each undivided residual video block may be associated with a different TU of the CU. The sizes and positions of the residual video blocks associated with TUs of a CU may or may not be based on the sizes and positions of video blocks associated with the PUs of the CU. A quadtree structure known as a "residual quad tree" (RQT) may include nodes associated with each of the residual video blocks. The TUs of a CU may correspond to leaf nodes of the RQT.

Transform processing unit 104 may generate one or more transform coefficient blocks for each TU of a CU by applying one or more transforms to a residual video block associated with the TU. Each of the transform coefficient blocks may be a 2D matrix of transform coefficients. Transform processing unit 104 may apply various transforms to the residual video block associated with a TU. For example, transform processing unit 104 may apply a discrete cosine transform (DCT), a directional transform, or a conceptually similar transform to the residual video block associated with a TU.

After transform processing unit 104 generates a transform coefficient block associated with a TU, quantization unit 106 may quantize the transform coefficients in the transform coefficient block. Quantization unit 106 may quantize a transform coefficient block associated with a TU of a CU based on a QP value associated with the CU.

The video encoder 20 may associate a QP value with a CU in various ways. For example, the video encoder 20 may perform a rate-distortion analysis on a treeblock associated with the CU. In the rate-distortion analysis, the video encoder 20 may generate multiple coded representations of the treeblock by performing an encoding operation multiple times on the treeblock. The video encoder 20 may associate different QP values with the CU when the video encoder 20 generates different encoded representations of the treeblock. The video encoder 20 may signal that a given QP value is associated with the CU when the given QP value is associated with the CU in a coded representation of the treeblock that has a lowest bitrate and distortion metric.

Inverse quantization unit 108 and inverse transform unit 110 may apply inverse quantization and inverse transforms to the transform coefficient block, respectively, to reconstruct a residual video block from the transform coefficient block. Reconstruction unit 112 may add the reconstructed residual video block to corresponding samples from one or more predicted video blocks generated by prediction processing unit 100 to produce a reconstructed video block associated with a TU. By reconstructing video blocks for each TU of a CU in this way, the video encoder 20 may reconstruct the video block of the CU.

After reconstruction unit 112 reconstructs the video block of a CU, filter unit 113 may perform a deblocking operation to reduce blocking artifacts in the video block associated with the CU. After performing the one or more deblocking operations, filter unit 113 may store the reconstructed video block of the CU in decoded picture buffer 114. Motion estimation unit 122 and motion compensation unit 124 may use a reference picture that contains the reconstructed video block to perform inter prediction on PUs of subsequent pictures. In addition, intra prediction unit 126 may use reconstructed video blocks in decoded picture buffer 114 to perform intra prediction on other PUs in the same picture as the CU.

Entropy encoding unit 116 may receive data from other functional components of the video encoder 20. For example, entropy encoding unit 116 may receive transform coefficient blocks from quantization unit 106 and may receive syntax elements from prediction processing unit 100. When entropy encoding unit 116 receives the data, entropy encoding unit 116 may perform one or more entropy encoding operations to generate entropy encoded data. For example, the video encoder 20 may perform a context adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, or another type of entropy encoding operation on the data. Entropy encoding unit 116 may output a bitstream that includes the entropy encoded data.

As part of performing an entropy encoding operation on data, entropy encoding unit 116 may select a context model. If entropy encoding unit 116 is performing a CABAC operation, the context model may indicate estimates of probabilities of particular bins having particular values. In the context of CABAC, the term "bin" is used to refer to a bit of a binarized version of a syntax element.

Multi-Layer Video Encoder

Figure 2B:
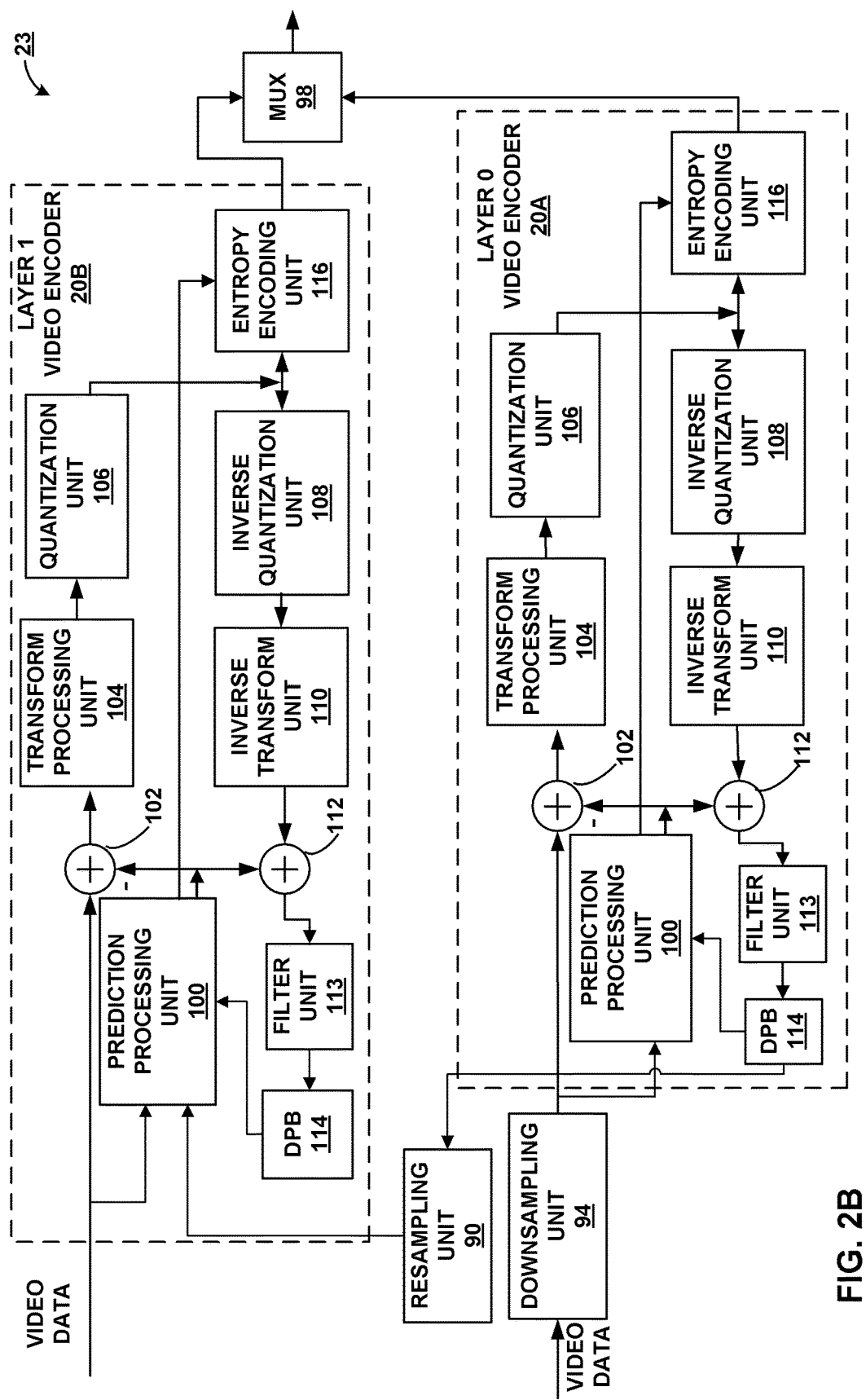
FIG. 2B is a block diagram illustrating an example of a video encoder that may implement techniques in accordance with aspects described in this disclosure.

FIG. 2B is a block diagram illustrating an example of a multi-layer video encoder 23 (also simply referred to as video encoder 23) that may implement techniques in accordance with aspects described in this disclosure. The video encoder 23 may be configured to process multi-layer video frames, such as for SHVC and multiview coding. Further, the video encoder 23 may be configured to perform any or all of the techniques of this disclosure.

The video encoder 23 includes a video encoder 20A and video encoder 20B, each of which may be configured as the video encoder 20 and may perform the functions described above with respect to the video encoder 20. Further, as indicated by the reuse of reference numbers, the video encoders 20A and 20B may include at least some of the systems and subsystems as the video encoder 20. Although the video encoder 23 is illustrated as including two video encoders 20A and 20B, the video encoder 23 is not limited as such and may include any number of video encoder 20 layers. In some embodiments, the video encoder 23 may include a video encoder 20 for each picture or frame in an access unit. For example, an access unit that includes five pictures may be processed or encoded by a video encoder that includes five encoder layers. In some embodiments, the video encoder 23 may include more encoder layers than frames in an access unit. In some such cases, some of the video encoder layers may be inactive when processing some access units.

In addition to the video encoders 20A and 20B, the video encoder 23 may include an resampling unit 90. The resampling unit 90 may, in some cases, upsample a base layer of a received video frame to, for example, create an enhancement layer. The resampling unit 90 may upsample particular information associated with the received base layer of a frame, but not other information. For example, the resampling unit 90 may up sample the spatial size or number of pixels of the base layer, but the number of slices or the POC may remain constant. In some cases, the resampling unit 90 may not process the received video and/or may be optional. For example, in some cases, the prediction processing unit 100 may perform upsampling. In some embodiments, the resampling unit 90 is configured to upsample a layer and reorganize, redefine, modify, or adjust one or more slices to comply with a set of slice boundary rules and/or raster scan rules. Although primarily described as upsampling a base layer, or a lower layer in an access unit, in some cases, the resampling unit 90 may downsample a layer. For example, if during streaming of a video bandwidth is reduced, a frame may be downsampled instead of upsampled.

The resampling unit 90 may be configured to receive a picture or frame (or picture information associated with the picture) from the decoded picture buffer 114 of the lower layer encoder (e.g., the video encoder 20A) and to upsample the picture (or the received picture information). This upsampled picture may then be provided to the prediction processing unit 100 of a higher layer encoder (e.g., the video encoder 20B) configured to encode a picture in the same access unit as the lower layer encoder. In some cases, the higher layer encoder is one layer removed from the lower layer encoder. In other cases, there may be one or more higher layer encoders between the layer 0 video encoder and the layer 1 encoder of FIG. 2B.

In some cases, the resampling unit 90 may be omitted or bypassed. In such cases, the picture from the decoded picture buffer 114 of the video encoder 20A may be provided directly, or at least without being provided to the resampling unit 90, to the prediction processing unit 100 of the video encoder 20B. For example, if video data provided to the video encoder 20B and the reference picture from the decoded picture buffer 114 of the video encoder 20A are of the same size or resolution, the reference picture may be provided to the video encoder 20B without any resampling.

In some embodiments, the video encoder 23 downsamples video data to be provided to the lower layer encoder using the downsampling unit 94 before provided the video data to the video encoder 20A. Alternatively, the downsampling unit 94 may be a resampling unit 90 capable of upsampling or downsampling the video data. In yet other embodiments, the downsampling unit 94 may be omitted.

As illustrated in FIG. 2B, the video encoder 23 may further include a multiplexor 98, or mux. The mux 98 can output a combined bitstream from the video encoder 23. The combined bitstream may be created by taking a bitstream from each of the video encoders 20A and 20B and alternating which bitstream is output at a given time. While in some cases the bits from the two (or more in the case of more than two video encoder layers) bitstreams may be alternated one bit at a time, in many cases the bitstreams are combined differently. For example, the output bitstream may be created by alternating the selected bitstream one block at a time. In another example, the output bitstream may be created by outputting a non-1:1 ratio of blocks from each of the video encoders 20A and 20B. For instance, two blocks may be output from the video encoder 20B for each block output from the video encoder 20A. In some embodiments, the output stream from the mux 98 may be preprogrammed. In other embodiments, the mux 98 may combine the bitstreams from the video encoders 20A, 20B based on a control signal received from a system external to the video encoder 23, such as from a processor on a source device including the source device 12. The control signal may be generated based on the resolution or bitrate of a video from the video source 18, based on a bandwidth of the link 16, based on a subscription associated with a user (e.g., a paid subscription versus a free subscription), or based on any other factor for determining a resolution output desired from the video encoder 23.

Video Decoder

Figure 3A:
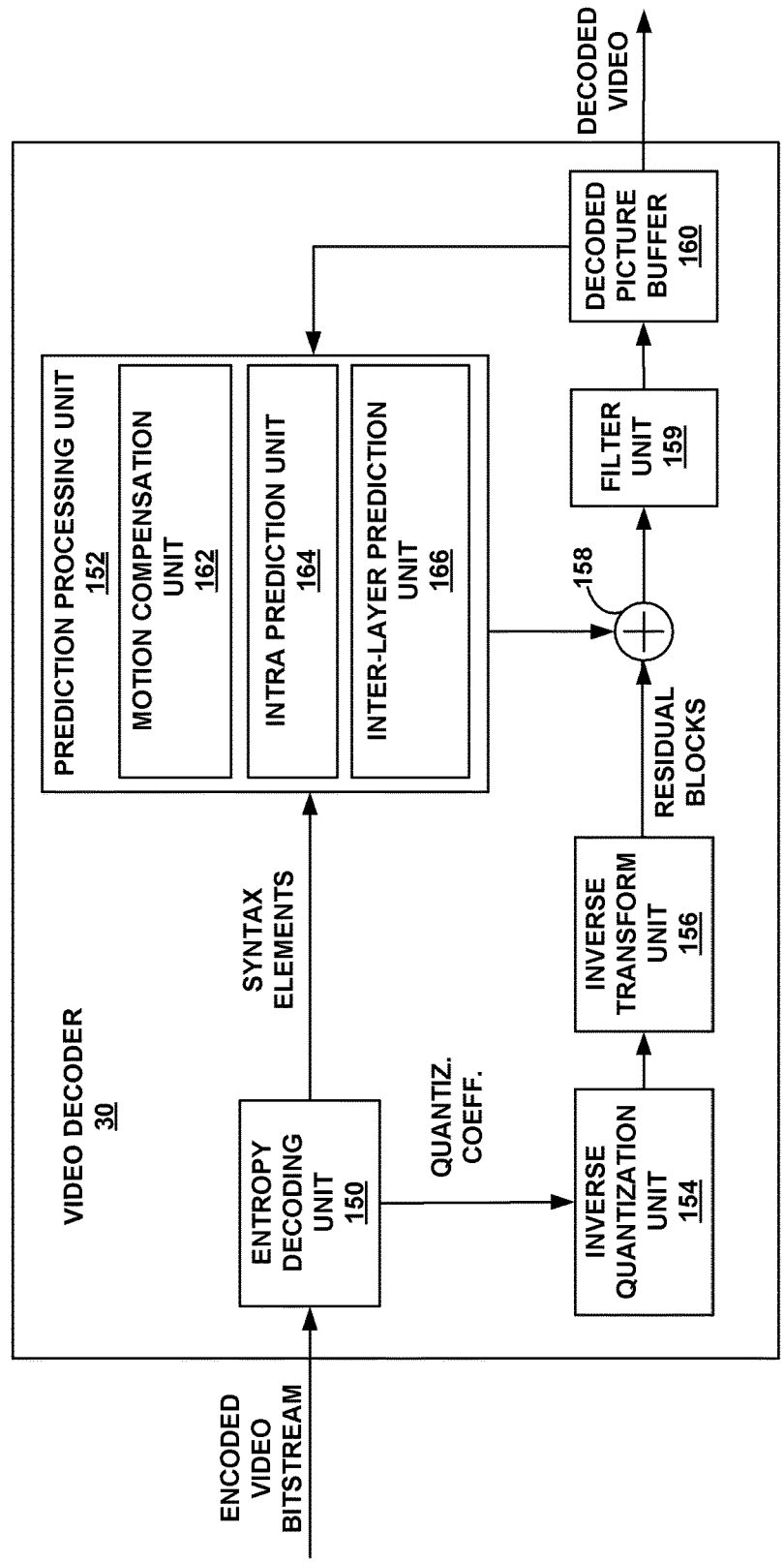
FIG. 3A is a block diagram illustrating an example of a video decoder that may implement techniques in accordance with aspects described in this disclosure.

FIG. 3A is a block diagram illustrating an example of the video decoder 30 that may implement techniques in accordance with aspects described in this disclosure. The video decoder 30 may be configured to process a single layer of a video frame, such as for HEVC. Further, the video decoder 30 may be configured to perform any or all of the techniques of this disclosure, including but not limited to the methods of inferring NoOutputOfPriorPicsFlag and related processes described in greater detail above and below with respect to FIGS. 4 and 5. As one example, motion compensation unit 162 and/or intra prediction unit 164 may be configured to perform any or all of the techniques described in this disclosure. In one embodiment, the video decoder 30 may optionally include inter-layer prediction unit 166 that is configured to perform any or all of the techniques described in this disclosure. In other embodiments, inter-layer prediction can be performed by prediction processing unit 152 (e.g., motion compensation unit 162 and/or intra prediction unit 164), in which case the inter-layer prediction unit 166 may be omitted. However, aspects of this disclosure are not so limited. In some examples, the techniques described in this disclosure may be shared among the various components of the video decoder 30. In some examples, additionally or alternatively, a processor (not shown) may be configured to perform any or all of the techniques described in this disclosure.

For purposes of explanation, this disclosure describes the video decoder 30 in the context of HEVC coding. However, the techniques of this disclosure may be applicable to other coding standards or methods. The example depicted in FIG. 3A is for a single layer codec. However, as will be described further with respect to FIG. 3B, some or all of the video decoder 30 may be duplicated for processing of a multi-layer codec.

In the example of FIG. 3A, the video decoder 30 includes a plurality of functional components. The functional components of the video decoder 30 include an entropy decoding unit 150, a prediction processing unit 152, an inverse quantization unit 154, an inverse transform unit 156, a reconstruction unit 158, a filter unit 159, and a decoded picture buffer 160. Prediction processing unit 152 includes a motion compensation unit 162, an intra prediction unit 164, and an inter-layer prediction unit 166. In some examples, the video decoder 30 may perform a decoding pass generally reciprocal to the encoding pass described with respect to the video encoder 20 of FIG. 2A. In other examples, the video decoder 30 may include more, fewer, or different functional components.

The video decoder 30 may receive a bitstream that comprises encoded video data. The bitstream may include a plurality of syntax elements. When the video decoder 30 receives the bitstream, entropy decoding unit 150 may perform a parsing operation on the bitstream. As a result of performing the parsing operation on the bitstream, entropy decoding unit 150 may extract syntax elements from the bitstream. As part of performing the parsing operation, entropy decoding unit 150 may entropy decode entropy encoded syntax elements in the bitstream. Prediction processing unit 152, inverse quantization unit 154, inverse transform unit 156, reconstruction unit 158, and filter unit 159 may perform a reconstruction operation that generates decoded video data based on the syntax elements extracted from the bitstream.

As discussed above, the bitstream may comprise a series of NAL units. The NAL units of the bitstream may include video parameter set NAL units, sequence parameter set NAL units, picture parameter set NAL units, SEI NAL units, and so on. As part of performing the parsing operation on the bitstream, entropy decoding unit 150 may perform parsing operations that extract and entropy decode sequence parameter sets from sequence parameter set NAL units, picture parameter sets from picture parameter set NAL units, SEI data from SEI NAL units, and so on.

In addition, the NAL units of the bitstream may include coded slice NAL units. As part of performing the parsing operation on the bitstream, entropy decoding unit 150 may perform parsing operations that extract and entropy decode coded slices from the coded slice NAL units. Each of the coded slices may include a slice header and slice data. The slice header may contain syntax elements pertaining to a slice. The syntax elements in the slice header may include a syntax element that identifies a picture parameter set associated with a picture that contains the slice. Entropy decoding unit 150 may perform entropy decoding operations, such as CABAC decoding operations, on syntax elements in the coded slice header to recover the slice header.

As part of extracting the slice data from coded slice NAL units, entropy decoding unit 150 may perform parsing operations that extract syntax elements from coded CUs in the slice data. The extracted syntax elements may include syntax elements associated with transform coefficient blocks. Entropy decoding unit 150 may then perform CABAC decoding operations on some of the syntax elements.

After entropy decoding unit 150 performs a parsing operation on a non-partitioned CU, the video decoder 30 may perform a reconstruction operation on the non-partitioned CU. To perform the reconstruction operation on a non-partitioned CU, the video decoder 30 may perform a reconstruction operation on each TU of the CU. By performing the reconstruction operation for each TU of the CU, the video decoder 30 may reconstruct a residual video block associated with the CU.

As part of performing a reconstruction operation on a TU, inverse quantization unit 154 may inverse quantize, e.g., de-quantize, a transform coefficient block associated with the TU. Inverse quantization unit 154 may inverse quantize the transform coefficient block in a manner similar to the inverse quantization processes proposed for HEVC or defined by the H.264 decoding standard. Inverse quantization unit 154 may use a quantization parameter QP calculated by the video encoder 20 for a CU of the transform coefficient block to determine a degree of quantization and, likewise, a degree of inverse quantization for inverse quantization unit 154 to apply.

After inverse quantization unit 154 inverse quantizes a transform coefficient block, inverse transform unit 156 may generate a residual video block for the TU associated with the transform coefficient block. Inverse transform unit 156 may apply an inverse transform to the transform coefficient block in order to generate the residual video block for the TU. For example, inverse transform unit 156 may apply an inverse DCT, an inverse integer transform, an inverse Karhunen-Loeve transform (KLT), an inverse rotational transform, an inverse directional transform, or another inverse transform to the transform coefficient block. In some examples, inverse transform unit 156 may determine an inverse transform to apply to the transform coefficient block based on signaling from the video encoder 20. In such examples, inverse transform unit 156 may determine the inverse transform based on a signaled transform at the root node of a quadtree for a treeblock associated with the transform coefficient block. In other examples, inverse transform unit 156 may infer the inverse transform from one or more coding characteristics, such as block size, coding mode, or the like. In some examples, inverse transform unit 156 may apply a cascaded inverse transform.

In some examples, motion compensation unit 162 may refine the predicted video block of a PU by performing interpolation based on interpolation filters. Identifiers for interpolation filters to be used for motion compensation with sub-sample precision may be included in the syntax elements. Motion compensation unit 162 may use the same interpolation filters used by the video encoder 20 during generation of the predicted video block of the PU to calculate interpolated values for sub-integer samples of a reference block. Motion compensation unit 162 may determine the interpolation filters used by the video encoder 20 according to received syntax information and use the interpolation filters to produce the predicted video block.

As further discussed below with reference to FIGS. 8-9, the prediction processing unit 152 may code (e.g., encode or decode) the PU (or any other reference layer and/or enhancement layer blocks or video units) by performing the methods illustrated in FIGS. 8-9. For example, motion compensation unit 162, intra prediction unit 164, or inter-layer prediction unit 166 may be configured to perform the methods illustrated in FIGS. 8-9, either together or separately.

If a PU is encoded using intra prediction, intra prediction unit 164 may perform intra prediction to generate a predicted video block for the PU. For example, intra prediction unit 164 may determine an intra prediction mode for the PU based on syntax elements in the bitstream. The bitstream may include syntax elements that intra prediction unit 164 may use to determine the intra prediction mode of the PU.

In some instances, the syntax elements may indicate that intra prediction unit 164 is to use the intra prediction mode of another PU to determine the intra prediction mode of the current PU. For example, it may be probable that the intra prediction mode of the current PU is the same as the intra prediction mode of a neighboring PU. In other words, the intra prediction mode of the neighboring PU may be the most probable mode for the current PU. Hence, in this example, the bitstream may include a small syntax element that indicates that the intra prediction mode of the PU is the same as the intra prediction mode of the neighboring PU. Intra prediction unit 164 may then use the intra prediction mode to generate prediction data (e.g., predicted samples) for the PU based on the video blocks of spatially neighboring PUs.

As discussed above, the video decoder 30 may also include inter-layer prediction unit 166. Inter-layer prediction unit 166 is configured to predict a current block (e.g., a current block in the EL) using one or more different layers that are available in SVC (e.g., a base or reference layer). Such prediction may be referred to as inter-layer prediction. Inter-layer prediction unit 166 utilizes prediction methods to reduce inter-layer redundancy, thereby improving coding efficiency and reducing computational resource requirements. Some examples of inter-layer prediction include inter-layer intra prediction, inter-layer motion prediction, and inter-layer residual prediction. Inter-layer intra prediction uses the reconstruction of co-located blocks in the base layer to predict the current block in the enhancement layer. Inter-layer motion prediction uses motion information of the base layer to predict motion in the enhancement layer. Inter-layer residual prediction uses the residue of the base layer to predict the residue of the enhancement layer. Each of the inter-layer prediction schemes is discussed below in greater detail.

Reconstruction unit 158 may use the residual video blocks associated with TUs of a CU and the predicted video blocks of the PUs of the CU, e.g., either intra-prediction data or inter-prediction data, as applicable, to reconstruct the video block of the CU. Thus, the video decoder 30 may generate a predicted video block and a residual video block based on syntax elements in the bitstream and may generate a video block based on the predicted video block and the residual video block.

After reconstruction unit 158 reconstructs the video block of the CU, filter unit 159 may perform a deblocking operation to reduce blocking artifacts associated with the CU. After filter unit 159 performs a deblocking operation to reduce blocking artifacts associated with the CU, the video decoder 30 may store the video block of the CU in decoded picture buffer 160. Decoded picture buffer 160 may provide reference pictures for subsequent motion compensation, intra prediction, and presentation on a display device, such as display device 32 of FIG. 1A or 1B. For instance, the video decoder 30 may perform, based on the video blocks in decoded picture buffer 160, intra prediction or inter prediction operations on PUs of other CUs.

Multi-Layer Decoder

Figure 3B:
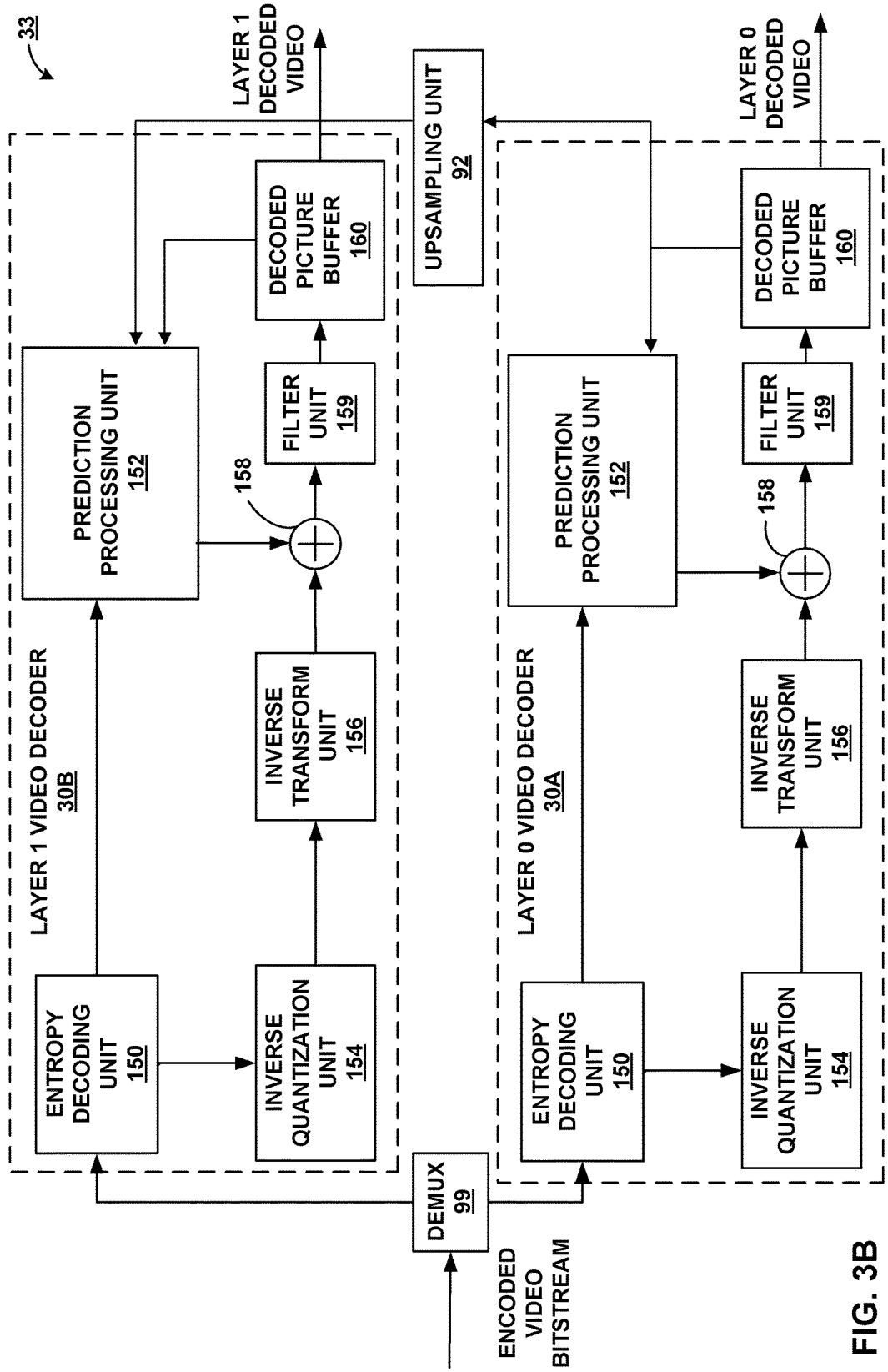
FIG. 3B is a block diagram illustrating an example of a video decoder that may implement techniques in accordance with aspects described in this disclosure.

FIG. 3B is a block diagram illustrating an example of a multi-layer video decoder 33 (also simply referred to as video decoder 33) that may implement techniques in accordance with aspects described in this disclosure. The video decoder 33 may be configured to process multi-layer video frames, such as for SHVC and multiview coding. Further, the video decoder 33 may be configured to perform any or all of the techniques of this disclosure.

The video decoder 33 includes a video decoder 30A and video decoder 30B, each of which may be configured as the video decoder 30 and may perform the functions described above with respect to the video decoder 30. Further, as indicated by the reuse of reference numbers, the video decoders 30A and 30B may include at least some of the systems and subsystems as the video decoder 30. Although the video decoder 33 is illustrated as including two video decoders 30A and 30B, the video decoder 33 is not limited as such and may include any number of video decoder 30 layers. In some embodiments, the video decoder 33 may include a video decoder 30 for each picture or frame in an access unit. For example, an access unit that includes five pictures may be processed or decoded by a video decoder that includes five decoder layers. In some embodiments, the video decoder 33 may include more decoder layers than frames in an access unit. In some such cases, some of the video decoder layers may be inactive when processing some access units.

In addition to the video decoders 30A and 30B, the video decoder 33 may include an upsampling unit 92. In some embodiments, the upsampling unit 92 may upsample a base layer of a received video frame to create an enhanced layer to be added to the reference picture list for the frame or access unit. This enhanced layer can be stored in the decoded picture buffer 160. In some embodiments, the upsampling unit 92 can include some or all of the embodiments described with respect to the resampling unit 90 of FIG. 2A. In some embodiments, the upsampling unit 92 is configured to upsample a layer and reorganize, redefine, modify, or adjust one or more slices to comply with a set of slice boundary rules and/or raster scan rules. In some cases, the upsampling unit 92 may be a resampling unit configured to upsample and/or downsample a layer of a received video frame The upsampling unit 92 may be configured to receive a picture or frame (or picture information associated with the picture) from the decoded picture buffer 160 of the lower layer decoder (e.g., the video decoder 30A) and to upsample the picture (or the received picture information). This upsampled picture may then be provided to the prediction processing unit 152 of a higher layer decoder (e.g., the video decoder 30B) configured to decode a picture in the same access unit as the lower layer decoder. In some cases, the higher layer decoder is one layer removed from the lower layer decoder. In other cases, there may be one or more higher layer decoders between the layer 0 decoder and the layer 1 decoder of FIG. 3B.

In some cases, the upsampling unit 92 may be omitted or bypassed. In such cases, the picture from the decoded picture buffer 160 of the video decoder 30A may be provided directly, or at least without being provided to the upsampling unit 92, to the prediction processing unit 152 of the video decoder 30B. For example, if video data provided to the video decoder 30B and the reference picture from the decoded picture buffer 160 of the video decoder 30A are of the same size or resolution, the reference picture may be provided to the video decoder 30B without upsampling. Further, in some embodiments, the upsampling unit 92 may be a resampling unit 90 configured to upsample or downsample a reference picture received from the decoded picture buffer 160 of the video decoder 30A.

As illustrated in FIG. 3B, the video decoder 33 may further include a demultiplexor 99, or demux. The demux 99 can split an encoded video bitstream into multiple bitstreams with each bitstream output by the demux 99 being provided to a different video decoder 30A and 30B. The multiple bitstreams may be created by receiving a bitstream and each of the video decoders 30A and 30B receives a portion of the bitstream at a given time. While in some cases the bits from the bitstream received at the demux 99 may be alternated one bit at a time between each of the video decoders (e.g., video decoders 30A and 30B in the example of FIG. 3B), in many cases the bitstream is divided differently. For example, the bitstream may be divided by alternating which video decoder receives the bitstream one block at a time. In another example, the bitstream may be divided by a non-1:1 ratio of blocks to each of the video decoders 30A and 30B. For instance, two blocks may be provided to the video decoder 30B for each block provided to the video decoder 30A. In some embodiments, the division of the bitstream by the demux 99 may be preprogrammed. In other embodiments, the demux 99 may divide the bitstream based on a control signal received from a system external to the video decoder 33, such as from a processor on a destination device including the destination device 14. The control signal may be generated based on the resolution or bitrate of a video from the input interface 28, based on a bandwidth of the link 16, based on a subscription associated with a user (e.g., a paid subscription versus a free subscription), or based on any other factor for determining a resolution obtainable by the video decoder 33.

Intra Random Access Point (IRAP) Pictures

Some video coding schemes may provide various random access points throughout the bitstream such that the bitstream may be decoded starting from any of those random access points without needing to decode any pictures that precede those random access points in the bitstream. In such video coding schemes, pictures that follow a random access point in output order (e.g., including those pictures that are in the same access unit as the picture providing the random access point) can be correctly decoded without using any pictures that precede the random access point. For example, even if a portion of the bitstream is lost during transmission or during decoding, a decoder can resume decoding the bitstream starting from the next random access point. Support for random access may facilitate, for example, dynamic streaming services, seek operations, channel switching, etc. In some cases, pictures that follow a random access point in output order may use leading pictures for decoding. Leading pictures may refer to pictures that follow the random access point in the bitstream and are output and displayed before the random access point.

In some coding schemes, such random access points may be provided by pictures that are referred to as IRAP pictures. For example, a random access point (e.g., provided by an enhancement layer IRAP picture) in an enhancement layer ("layerA") contained in an access unit ("auA") may provide layer-specific random access such that for each reference layer ("layerB") of layerA (e.g., a reference layer being a layer that is used to predict layerA) having a random access point contained in an access unit ("auB") that is in layerB and precedes auA in decoding order (or a random access point contained in auA), the pictures in layerA that follow auB in output order (including those pictures located in auB), may be correctly decodable without needing to decode any pictures in layerA that precede auB. For example, when decoding starts from auB, and a picture in layerB and in auB is decodable, then the picture in layer A that is in auA and pictures in layerA that follow auA are decodable.

IRAP pictures may be coded using intra prediction (e.g., coded without referring to other pictures in the same layer), and may include, for example, instantaneous decoding refresh (IDR) pictures, clean random access (CRA) pictures, and broken link access (BLA) pictures. When there is an IDR picture in the bitstream, the pictures that precede the IDR picture in decoding order are not used for prediction by pictures that follow the IDR picture in decoding order. When there is a CRA picture in the bitstream, the pictures that follow the CRA picture may or may not use pictures that precede the CRA picture in decoding order for prediction. Those pictures that follow the CRA picture in decoding order but use pictures that precede the CRA picture in decoding order may be referred to as random access skipped leading (RASL) pictures. Another type of picture that follows an IRAP picture in decoding order and precedes the IRAP picture in output order is a random access decodable leading (RADL) picture, which may not contain references to any pictures that precede the IRAP picture in decoding order. RASL pictures may be discarded by the decoder if the pictures that precede the CRA picture are not available. RASL pictures may or may not be present after a BLA picture. When RASL pictures are present after BLA pictures, they should be ignored and/or not decoded because their reference pictures may not be available. An access unit (e.g., a group of pictures including the coded pictures associated with the same output time across multiple layers) containing a base layer picture (e.g., a picture having a layer ID value of 0) that is an IRAP picture may be referred to as an IRAP access unit.

Cross-Layer Alignment of IRAP Pictures

In HEVC extensions such as SHVC and MV-HEVC, IRAP pictures may not be required to be aligned (e.g., contained in the same access unit) across different layers. For example, if IRAP pictures were required to be aligned, any access unit containing at least one IRAP picture would only contain IRAP pictures. On the other hand, if IRAP pictures were not required to be aligned, in a single access unit, one picture (e.g., in a first layer) may be an IRAP picture, and another picture (e.g., in a second layer) may be a non-IRAP picture. Having such non-aligned IRAP pictures in a bitstream may provide some advantages. For example, in a two-layer bitstream, if there are more IRAP pictures in the base layer than in the enhancement layer, in broadcast and multicast applications, low tune-in delay and high coding efficiency can be achieved.

In some video coding schemes, a POC may be used to keep track of the relative order in which the decoded pictures are displayed. Some of such coding schemes may cause the POC values to be reset (e.g., set to zero or set to some value signaled in the bitstream) whenever certain types of pictures appear in the bitstream. For example, the POC values of certain IRAP pictures may be reset, causing the POC values of other pictures preceding those IRAP pictures in decoding order to also be reset. This may be problematic when the IRAP pictures are not required to be aligned across different layers. For example, when one picture ("picA") is an IRAP picture and another picture ("picB") in the same access unit is not an IRAP picture, the POC value of a picture ("picC"), which is reset due to picA being an IRAP picture, in the layer containing picA may be different from the POC value of a picture ("picD"), which is not reset, in the layer containing picB, where picC and picD are in the same access unit. This causes picC and picD to have different POC values even though they belong to the same access unit (e.g., same output time). Thus, in this example, the derivation process for deriving the POC values of picC and picD can be modified to produce POC values that are consistent with the definition of POC values and access units.

Resetting POC for Multi-Layer Coding

The poc_reset_idc syntax element may indicate whether the POC should be reset for a picture. The poc_reset_idc syntax element can indicate whether the MSB of the POC should be reset, or both the MSB and the LSB of the POC should be reset, or none should be reset. For example, the value of 0 for the poc_reset_idc indicates that the POC is not reset. The value of 1 for the poc_reset_idc indicates that the POC MSB should be reset. The value of 2 for the poc_reset_idc indicates that both the POC MSB and LSB should be reset. The value of 3 for the poc_reset_idc indicates that reset was indicated for a previous picture. For example, the value of poc_reset_idc for the previous picture was either 1 or 2. The value of 3 for poc_reset_idc may be used such that when the picture at which the POC should be reset is lost (e.g., during the decoding process), the POC can be properly reset at subsequent pictures.

The full_poc_reset_flag can indicate whether the reset for the previous picture was only for the POC MSB, or for both the POC MSB and LSB. For instance, the value of 0 for the full_poc_reset_flag indicates that only the MSB should be reset. The value of 1 for the full_poc_reset_flag indicates that both the MSB and LSB should be reset. The full_poc_reset_flag flag can be used in connection with poc_reset_idc. For example, when the value of poc_reset_idc is 3, the full_poc_reset_flag can indicate whether the POC reset for the previous picture was for only the MSB or for both the MSB and LSB.

In early versions of SHVC and MV-HEVC (e.g., SHVC Working Draft 6, MV-HEVC Working Draft 8, etc.), certain constraints or restrictions apply, e.g., with respect to poc_reset_idc. However, these constraints do not properly reset the POC when a picture is not present or when a picture is discardable. Certain details relating to these restrictions and issues associated with such restrictions are discussed in further detail below, for example, in sections describing Missing or Absent Pictures, Discardable Pictures, and Mixing of BLA and CRA Pictures.

In addition, in the early versions of SHVC and MV-HEVC, there are no restrictions on the value of full_poc_reset_flag of a picture based on poc_reset_idc of the POC resetting AU in the same POC resetting period. An incorrect value of full_poc_reset_flag may result in the POC reset mechanism not working properly. Certain details relating to full_poc_reset_flag are discussed in further detail below, for example, in the section describing the full_poc_reset_flag.

In order to address these and other challenges, the techniques according to certain aspects reset the POC when a picture is not present (e.g., missing or absent) or when a picture is discardable. The techniques also impose a restriction on the value of full_poc_reset_flag of a picture based on the value of poc_reset_idc. In this way, the techniques can make sure that the POC is reset correctly. For example, the POC can be reset correctly when the picture with poc_reset_idc equal to either 1 or 2 is missing. Certain details relating to POC reset are explained further below.

Missing or Absent Pictures

Some constraints related to the value of poc_reset_idc may be as follows. It may be a requirement of bitstream conformance that the following constraints apply:

The value of poc_reset_idc shall not be equal to 1 or 2 for a random access skipped leading (RASL) picture, a random access decodable leading (RADL) picture, a sub-layer non-reference picture, or a picture that has TemporalId greater than 0, or a picture that has discardable_flag equal to 1. TemporalID can indicate the ID of a temporal sub-layer of a layer.

The value of poc_reset_idc of all pictures in an AU shall be the same.

When the picture in an AU with nuh_layer_id equal to 0 is an intra random access point (IRAP) picture with a particular value of nal_unit_type and there is at least one other picture in the same AU with a different value of nal_unit_type, the value of poc_reset_idc shall be equal to 1 or 2 for all pictures in the AU.

When there is at least one picture (i) that has nuh_layer_id greater than 0 and (ii) that is an instantaneous decoder refresh (IDR) picture with a particular value of nal_unit_type in an AU and (iii) there is at least one other picture in the same AU with a different value of nal_unit_type, then the value of poc_reset_idc shall be equal to 1 or 2 for all pictures in the AU.

The value of poc_reset_idc of a clean random access (CRA) or broken link access (BLA) picture shall be less than 3.

When the picture with nuh_layer_id equal to 0 in an AU is an IDR picture and there is at least one non-IDR picture in the same AU, the value of poc_reset_idc shall be equal to 2 for all pictures in the AU.

When the picture with nuh_layer_id equal to 0 in an AU is not an IDR picture, the value of poc_reset_idc shall not be equal to 2 for any picture in the AU.

Of the above-listed constraints, the case where an AU that has pictures not present for some of the layers and that has one IRAP picture in at least one layer is not covered. For example, an AU (e.g., AU D) contains an IDR picture in the base layer (BL), but contains no picture in the enhancement layer (EL). A case where a layer does not have a picture in an AU may be described as the AU having a missing picture, an absent picture, a non-present picture, etc. The layer may not include a picture in this particular AU, or the picture may have been lost (e.g., during the decoding process). In such a situation, the POC should be reset because the POC of the IDR picture in the BL must be equal to 0. However, the POC chain in the enhancement layer continues. Failing to reset the POC of the enhancement layer pictures at AU D could result in a derived POC that is not cross-layer aligned for pictures in the subsequent AU. However, none of the above-listed restrictions for the value of poc_reset_idc are applicable for this situation, and therefore, the POC reset is not mandated for AU D.

In another example, an AU (e.g. AU D) contains an IDR picture in the EL, but contains no picture in the BL. Similarly, in such a situation, the POC should be reset because the POC MSB of the IDR picture in the EL will be reset to 0. However, with existing approaches, POC reset is not mandated for AU D.

To ensure correct behavior, the POC reset may be required in AU D for both cases described above. Furthermore, one or more pictures and/or AU that immediately follow AU D should have poc_reset_idc equal to 3. With these changes, the POC reset may be conducted for the layer where the picture was absent as soon as there is a picture in that layer.

Figure 4:
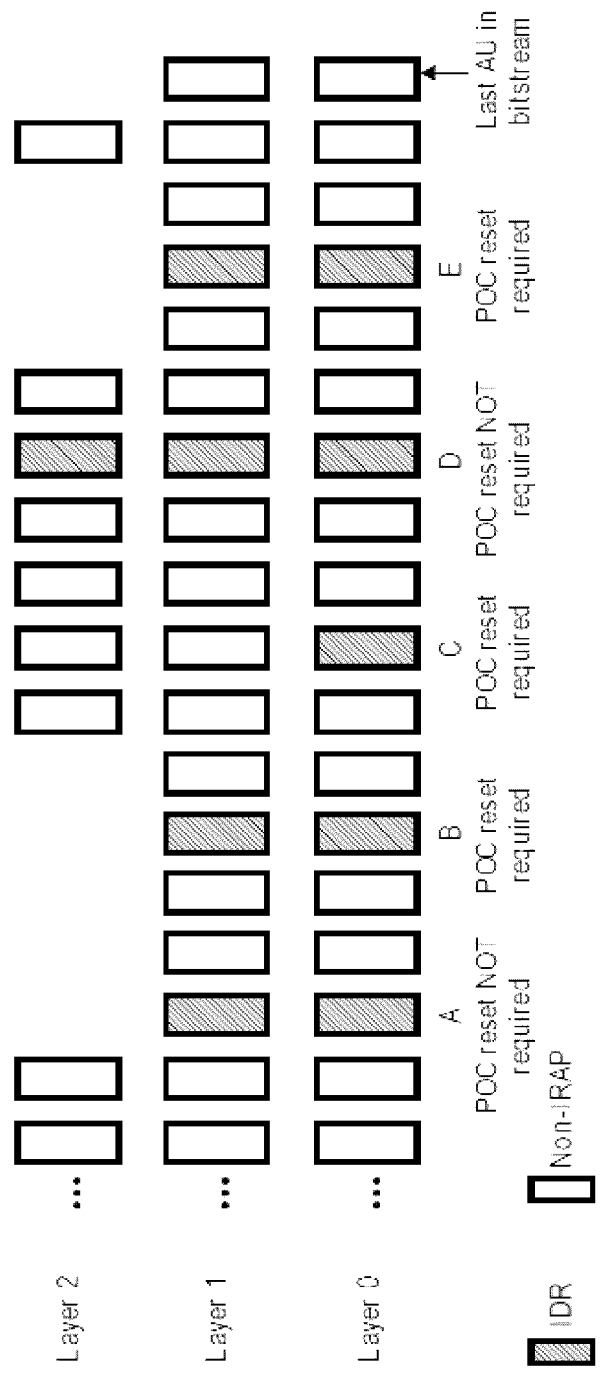
FIG. 4 is a block diagram illustrating an example configuration of pictures in different layers.

There may be cases where the POC does not have to be reset for an AU containing an IRAP picture and also missing pictures. FIG. 4 illustrates examples of such cases. AU A does not need to reset the POC since the missing pictures are from Layer 2 and there are no pictures in that layer until AU B that does reset the POC. AU B needs to reset POC because the second AU after AU B has a picture in Layer 2, unless that second AU itself does the POC reset (here, it is assumed that the second AU does not). AU C needs to reset POC because it has an IDR in Layer 0 but non-IRAP(s) in other layers. AU D does not need to reset the POC because the AU has a cross-layer aligned IDR and no missing picture. Finally, AU E needs to reset the POC because the second AU after AU E has a picture in Layer 2, unless that second AU itself does the POC reset (again, it is assumed that the second AU does not).

Discardable Pictures

The above-described problem for missing pictures may similarly apply to discardable pictures, which after being discarded would become absent pictures.

Figure 5:
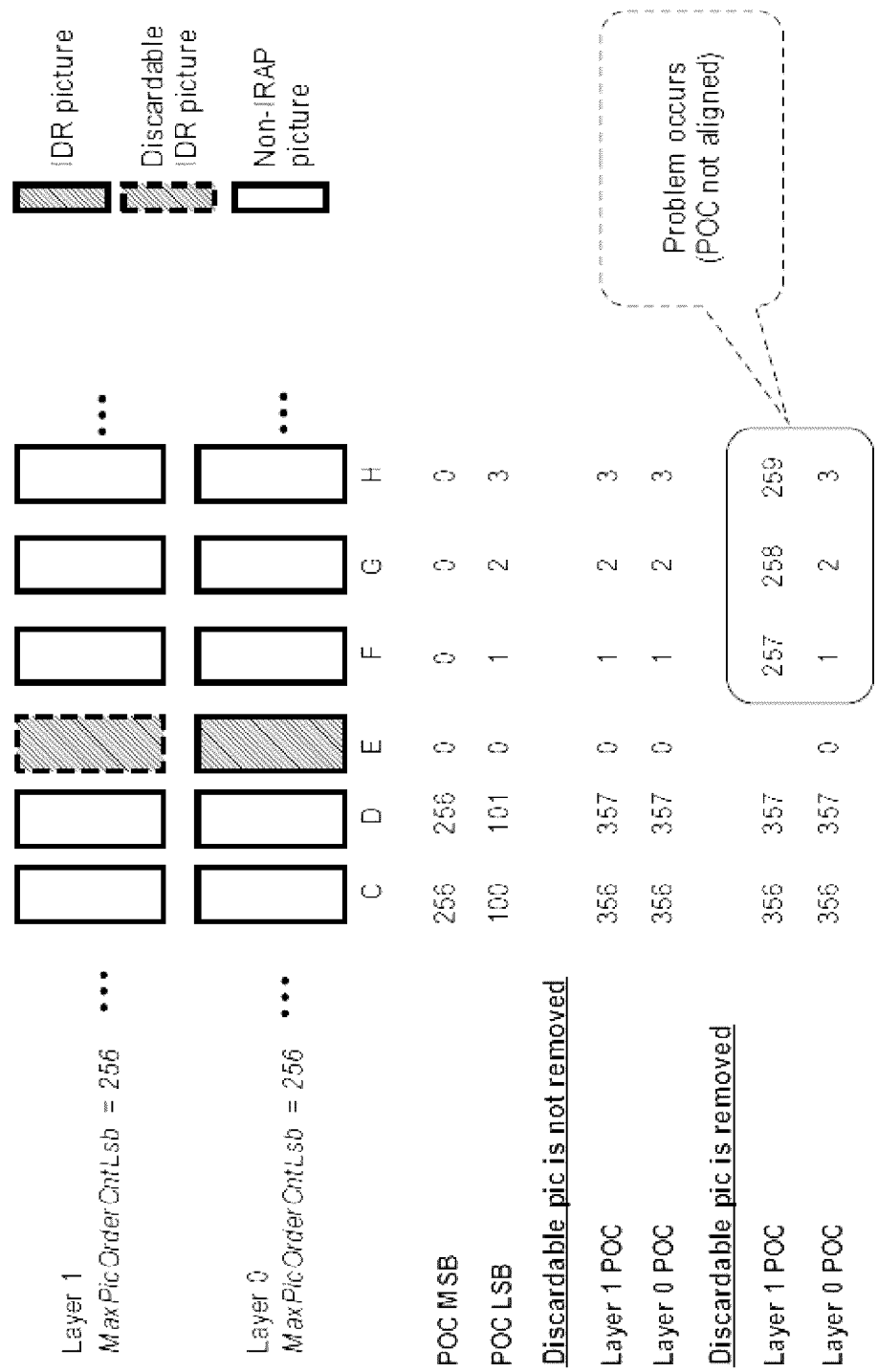
FIG. 5 is a block diagram illustrating an example configuration of pictures in different layers.

When IRAP pictures are cross-layer aligned, the POC reset is not required with existing approaches. However, there is no restriction that prohibits an IRAP picture from being marked as a discardable picture. When an AU auA contains cross-layer aligned IRAP pictures and at least one of the IRAP pictures is discardable, derivation of POC for the pictures in the subsequent AUs, in decoding order, may be incorrect if the discardable IRAP picture in the auA was removed as illustrated in the example of FIG. 5. When the EL IDR picture in AU E is discarded, the value of POC most significant bit (MSB) of the EL picture in AU F may be derived to be equal to the value of POC MSB of the previous anchor picture (e.g., 256). This can result in different POC values derived for pictures in the BL and the EL for AU F.

Mixing of BLA and CRA Pictures

With existing approaches, when a picture in an AU has nuh_layer_id equal to 0 and is an IRAP picture with a particular value of nal_unit_type, and there is at least one other picture in the same access unit with a different value of nal_unit_type, the value of poc_reset_idc is set equal to 1 or 2 for all pictures in the AU. This means that if an AU in a 2-layer bitstream contains a CRA picture in the BL and a BLA picture in the enhancement layer, then the POC reset, either resetting the POC MSB only or resetting both the POC MSB and least significant bit (LSB), is required. Such a constraint is not ideal, particularly for certain use-cases.

Figure 6:
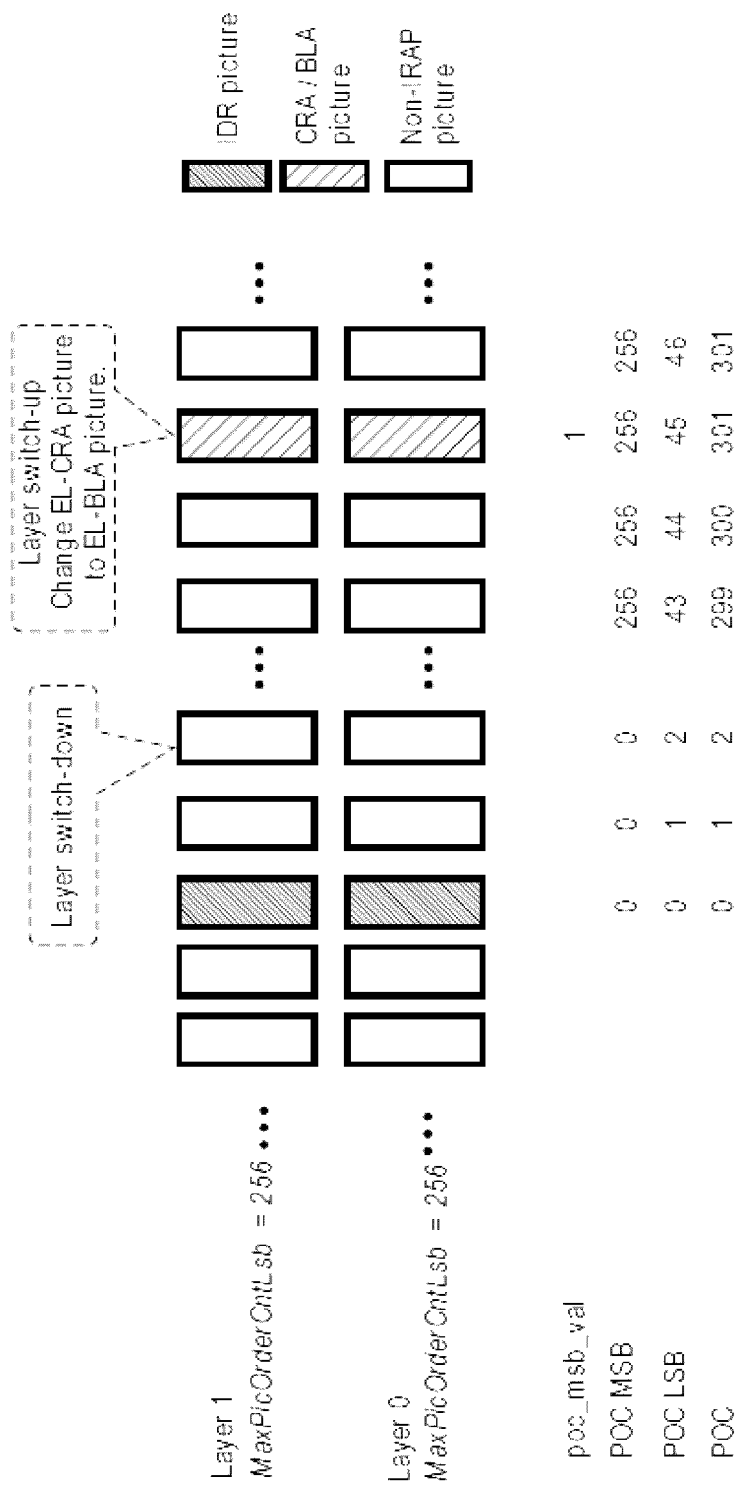
FIG. 6 is a block diagram illustrating an example configuration of pictures in different layers.

FIG. 6 illustrates a layer switch-down and switch-up example in which the layer switch-up is conducted at the AU that contains cross-layer aligned CRA pictures, auA. As it is not required to do the POC reset when the nal_unit_type values of IRAP are cross-layer aligned, an encoder may not signal any POC reset information (e.g., poc_reset_idc, poc_reset_period_id, etc) in the slice segment header extension in the CRA pictures of the auA. However, for the layer switch-up, the system may change the NAL unit_type of the EL picture of the auA from CRA to BLA. In such a case, the constraint implies that, in addition to changing the NAL unit type, a system entity that performs the switch-up operation also needs to modify the slice segment header extension of the pictures in the auA to insert POC reset information. Such an additional burden imposed on the system entity is unnecessary because the POC reset is not really needed in the illustrated situation. This applies similarly for splicing bitstreams at cross-layer aligned CRA pictures where only the base layer CRA picture is changed to be a BLA picture.

full_poc_reset_flag

Figure 7:
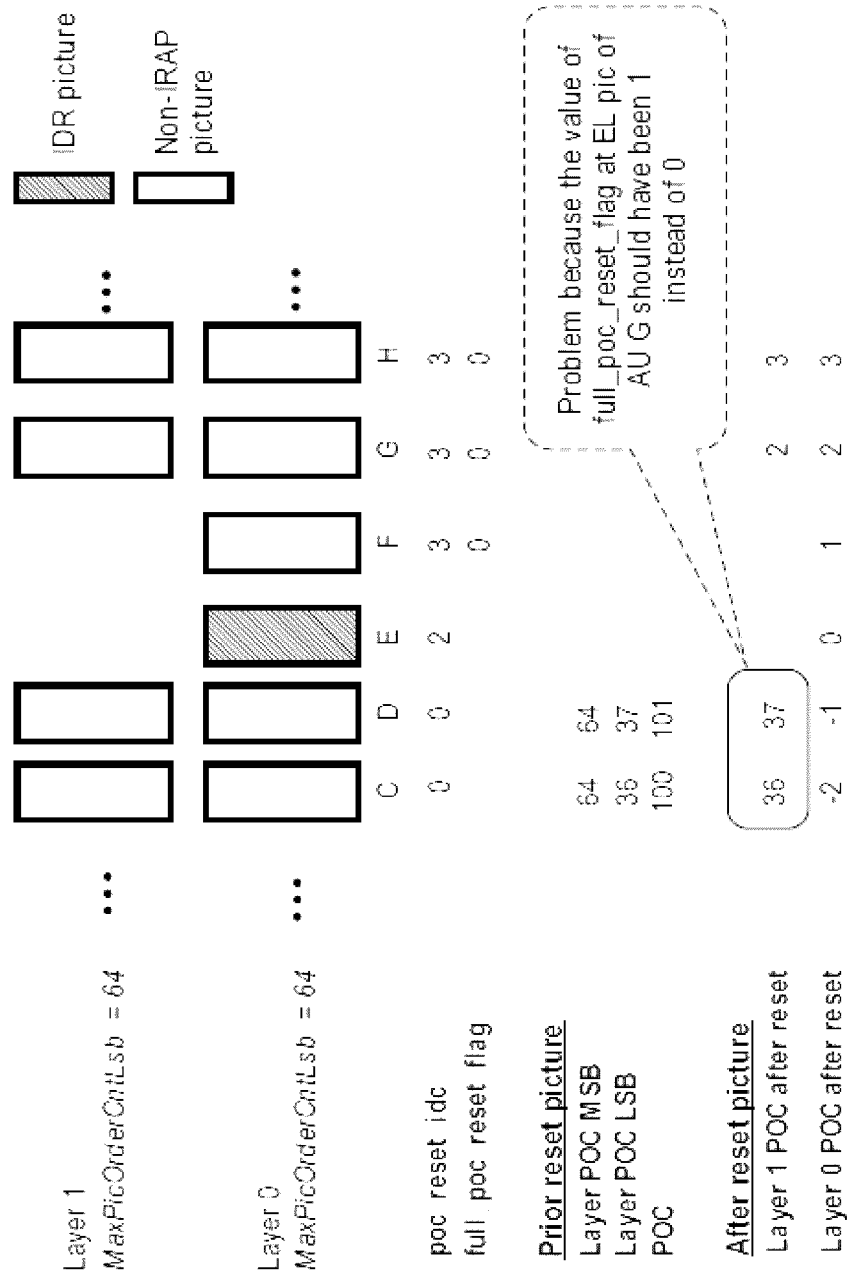
FIG. 7 is a block diagram illustrating an example configuration of pictures in different layers.

When poc_reset_idc is equal to 3, full_poc_reset_flag is signaled to indicate whether both the POC MSB and LSB should be reset or whether only the POC MSB should be reset. The value of full_poc_reset_flag can indicate the value of poc_reset_idc of the first access unit in the same POC resetting period. In some embodiments, a POC resetting period can refer to a sequence of access units in decoding order, starting with an access unit with poc_reset_idc equal to 1 or 2 and a particular value of poc_reset_period_id and including all access units that either have the same value of poc_reset_period_id or have poc_reset_idc equal to 0. If the wrong value of the full_poc_reset_flag is signalled, the decoder could decrement the POC of earlier pictures by the wrong value. FIG. 7, provided below, illustrates an example where the encoder assigns an incorrect value for full_poc_reset_flag. Since the value of poc_reset_idc of the picture in AU E is 2, which means that both the POC MSB and LSB are reset, the value of full_poc_reset_flag (when present, in the pictures that succeed, in decoding order, AU E and that belong to the same POC resetting period as AU E) must be 1 to guarantee that the correct value of DeltaPocVal is derived to decrement the value of POC of earlier pictures. Since the value of full_poc_reset_flag is incorrectly signaled as 0 for the Layer 1 picture in AU G, the value used to decrement the POC of pictures of Layer 1 (that precede, in decoding order, AU E) is 64 instead of 102. The incorrect POC values of earlier pictures may affect the reference picture selection (RPS) derivation process as the decoder cannot find the correct reference pictures for the current picture. In the illustrated example of FIG. 7, during the RPS derivation of the Layer 1 picture of AU G, the decoder cannot find reference pictures with POC equal to −1 and −2, and hence these reference pictures are marked "unavailable for reference".

Resetting POC and Setting Value of full_poc_reset_flag

To overcome the above-described issues with existing approaches for POC reset in multi-layer codecs, this disclosure describes improvements below. In this disclosure, the following described techniques and approaches may be used solely or in any combination.

In accordance with one or more aspects of the POC reset techniques described herein, there is provided an update of constraints related to the value of poc_reset_idc. As such, if there is at least one missing picture in the AU auA that contains an IRAP picture at the BL or an IDR picture in an EL, then the value of poc_reset_idc should be equal to 1 or 2 for all pictures in the AU.

For example, one way to detect a missing picture for the AU auA is as follows: when the number of picture(s) in the AU auA is less than the number of pictures in the bitstream, then the AU auA may be indicated or presumed as having missing pictures.

In another example, the value of poc_reset_idc is constrained to be equal to 1 or 2 when there is at least one missing picture in the layer layerIdA of the AU auA that contains an IRAP picture at a BL or an IDR picture in an EL and there is another AU auB that satisfies at least one of the following:
  belongs to a different POC resetting period than the access unit auA;
  has an IRAP picture with nuh_layer_id equal to 0 and NoClrasOutputFlag equal to 1; or
  is the last access unit in the bitstream in decoding order and there is a picture with nuh_layer_id equal to layerIdA that follows auA in decoding order and precedes the AU auB in decoding order.

In another example, when there is no picture with nuh_layer equal to any particular value of nuh_layer_id layerIdA in the access unit auA, and there is a picture picA with nuh_layer_id equal to layerIdA that follows auA in decoding order and the following condition is true, then the AU auA may be indicated or presumed as having missing pictures:
  Let auB be the first AU that follows auA in decoding order and belongs to a different POC resetting period than the access unit auA, when present. Let auC be the first access unit that follows auA in decoding order and has an IRAP picture with nuh_layer_id equal to 0 and NoClrasOutputFlag equal to 1, when present. Let auD be the first access unit that follows auA in decoding order and has an IRAP picture in each of the layers in the bitstream, when present. Either none of auB, auC, and auD exists in the bitstream, or the picture picA precedes, in decoding order, the first of auB (when present), auC (when present), and auD (when present) in decoding order.

In accordance with one or more aspects of the POC reset techniques described herein, there is provided an update of constraints related to the value of poc_reset_idc. As such, when there is at least one discardable picture in the AU that contains IRAP picture at the BL or an IDR picture in an EL, then the value of poc_reset_idc should be equal to 1 or 2 for all pictures in the AU.

In another example, a constraint may be added such that the IRAP pictures cannot have discardable_flag equal to 1.

In yet another example, a constraint may be added such that the IDR pictures are disallowed to have discardable_flag equal to 1 but CRA and BLA pictures are allowed to have discardable_flag equal to 1.

In accordance with one or more aspects of the POC reset techniques described herein, a constraint may be added for poc_reset_idc to ensure that, when there is a missing picture or discardable picture of a layer layerA in an access unit auA that contains an IRAP picture at the BL or an IDR picture in an EL, starting from the first AU following auA, in decoding order, that has picture with nuh_layer_id equal to layerA until the first AU that follows auA, in decoding order, containing picture with nuh_layer_id equal to layerA that has TemporalId equal to 0 and has discardable_flag equal to 0, inclusive, the value of poc_reset_idc should be equal to 3.

In another example, poc_reset_idc should be equal to 3 for pictures of layer layerA contained in access units that follow, in decoding order, auA and precede, in decoding order, the first AU that follows auA, in decoding order, containing a picture with nuh_layer_id equal to layerA that has TemporalId equal to 0, has discardable_flag equal to 0 and is not a RASL, RADL or sub-layer non-reference picture, inclusive. A sub-layer non-reference picture (SLNR) may refer to a picture that is not used a reference picture by a temporal sublayer. For instance, a layer can consist of one or more temporal sub-layers that are indicated by a temporal ID (e.g., TemporalId). If a picture that is in the highest layer and that is at the highest temporal sub-layer is not used as a reference by other pictures in the same layer, it may be removed without causing the bitstream to become undecodable. In such case, the picture can be similar to a discardable picture.

In accordance with one or more aspects of the POC reset techniques described herein, a constraint may be added to ensure that the value of full_poc_reset_flag of a picture indicates the correct value of poc_reset_idc of the first AU in the same POC resetting period as the current picture.

In accordance with one or more aspects of the POC reset techniques described herein, an existing constraint for poc_reset_idc may be modified to ensure that when an AU contains only CRA or BLA pictures (but with any type of BLA picture), POC resetting is not required (e.g., poc_reset_idc is not required to be equal to 1 or 2).

EXEMPLARY EMBODIMENTS

The above mentioned techniques can be implemented as shown in the following examples. The examples are provided in the context of earlier versions of SHVC and MV-HEVC (e.g., SHVC WD 6 and MV-HEVC WD 8). Additions to the earlier versions of SHVC and MV-HEVC are indicated in italics, and deletions from the earlier versions of SHVC and MV-HEVC are indicated in strikethrough.

Exemplary Embodiment 1

Embodiment 1 resets the POC when there is an absent picture or a discardable picture in an AU. For example, a variable called absentPictureInAuFlag can indicate whether an AU contains an absent picture or a discardable picture. If the first AU in the same POC resetting period has an absent picture or a discardable picture in a particular layer, the value of poc_reset_idc is set to 3 for subsequent AUs in decoding order, starting with an AU that has a picture in the same layer and ending with an AU that has a picture that is in the same layer, has a temporal ID equal to 0, and is not discardable, inclusive. In addition, the value of full_poc_reset_flag can be set to the value of poc_reset_idc minus 1 when the value of poc_reset_idc of pictures in the first AU in the same POC resetting period is equal to 1 or 2.

For example, encoders should be cautious in setting the value of poc_reset_idc of pictures when there is a picture of a layer not present in an AU or there is a picture with discardable_flag equal to 1 present in an AU, to ensure that the derived POC values of pictures within an AU are cross-layer aligned. In some embodiments, such cases should be treated similarly as AUs with non-cross-layer-aligned IRAP pictures in terms of whether the POC should be reset.

TABLE 1

Exemplary Embodiment 1

*The variable absentPictureInAuFlag is derived as follows:*
    *If any of the two following conditions is true, the value of absentPictureInAuFlag is set to be 1:*
        *There is at least one picture in the same access unit that has discardable_flag equal to 1.*
        *The number of pictures in the access unit is less the number of layers in the bitstream.*
    *Otherwise, the value of absentPictureInAuFlag is set to be 0.*
It is a requirement of bitstream conformance that the following constraints apply:
    The value of poc_reset_idc shall not be equal to 1 or 2 for a RASL picture, a RADL picture, a sub-layer non-reference picture, or a picture that has TemporalId greater than 0, or a picture that has discardable_flag equal to 1.
    The value of poc_reset_idc of all pictures in an access unit shall be the same.
    When the picture in an access unit with nuh_layer_id equal to 0 is an IRAP picture ~~with a particular value of nal_unit_type~~ and there is at least one other picture in the same access unit that is not an IRAP picture *or absentPictureInAuFlag is equal to 1* ~~with a different value of nal_unit_type,~~ the value of poc_reset_idc shall be equal to 1 or 2 for all pictures in the access unit.
    When there is at least one picture that has nuh_layer_id greater than 0 and that is an IDR picture with a particular value of nal_unit_type in an access unit and there is at least one other picture in the same access unit with a different value of nal_unit_type *or absentPictureInAuFlag is equal to 1*, the value of poc_reset_idc shall be equal to 1 or 2 for all pictures in the access unit.
    The value of poc_reset_idc of a CRA or BLA picture shall be less than 3.
    When the picture with nuh_layer_id equal to 0 in an access unit is an IDR picture and there is at least one non-IDR picture in the same access unit *or absentPictureInAuFlag is equal to 1*, the value of poc_reset_idc shall be equal to 2 for all pictures in the access unit.
    When the picture with nuh_layer_id equal to 0 in an access unit is not an IDR picture, the value of poc_reset_idc shall not be equal to 2 for any picture in the access unit.
    *When the first access unit auA in the poc resetting period has no picture in a particular layer layerA or has picture that has discardable_flag equal to 1 in a particular layer layerA, the value of poc_reset_idc of pictures in the subsequent access units following auA, in decoding order, starting from the first access unit that has picture with nuh_layer_id equal to layerA until the access unit that has picture with nuh_layer_id equal to layerA, TemporalId equal to 0, and discardable_flag equal to 0, inclusive, shall be equal to 3.*
The value of poc_reset_idc of an access unit is the value of poc_reset_idc of the pictures in the access unit.
poc_reset_period_id identifies a POC resetting period. There shall be no two pictures consecutive in decoding order in the same layer that have the same value of poc_reset_period_id and poc_reset_idc equal to 1 or 2. When not present, the value of poc_reset_period_id is inferred as follows:
    If the previous picture picA that has poc_reset_period_id present in the slice segment header in present in the same layer of the bitstream as the current picture, the value of poc_reset_period_id is inferred to be equal to the value of the poc_reset_period_id of picA.
    Otherwise, the value of poc_reset_period_id is inferred to be equal to 0.
  NOTE - It is not prohibited for multiple pictures in a layer to have the same value of poc_reset_period_id and to have poc_reset_idc equal to 1 or 2 unless such pictures occur in two consecutive access units in decoding order. To minimize the likelihood of such two pictures appearing in the bitstream due to picture losses, bitstream extraction, seeking, or splicing operations, encoders should set the value of poc_reset_period_id to be a random value for each POC resetting period (subject to the constraints specified above).
It is a requirement of bitstream conformance that the following constraints apply:
    One POC resetting period shall not include more than one access unit with poc_reset_idc equal to 1 or 2.
    An access unit with poc_reset_idc equal to 1 or 2 shall be the first access unit in a POC resetting period.
    A picture that follows, in decoding order, the first POC resetting picture among all layers of a POC resetting period in decoding order shall not precede, in output order, another picture in any layer that precedes the first POC resetting picture in decoding order.
full_poc_reset_flag equal to 1 specifies that both the most significant bits and the least significant bits of the picture order count value for the current picture are reset when the previous picture in decoding order in the same layer does not belong to the same POC resetting period. full_poc_reset_flag equal to 0 specifies that only the most significant bits of the picture order count value for the current picture are reset when the previous picture in decoding order in the same layer does not belong to the same POC resetting period.
*It is a requirement of bitstream conformance that when the value of poc_reset_idc of pictures in the first access unit in the same POC resetting period is equal to 1 or 2, the value of full_poc_reset_flag, when present, shall be equal to poc_reset_idc − 1.*

Exemplary Embodiment 2

This embodiment is based on Embodiment 1, with the difference being that the derivation of the value of the variable absentPictureInAuFlag is as follows:

TABLE 2

Exemplary Embodiment 2

When an access unit auA has an IRAP picture with nuh_layer_id equal to 0 or an IDR picture with nuh_layer_id greater than 0, the variable absentPictureInAuFlag is derived as follows for the access unit auA:
    If any of the following two conditions is true, the value of absentPictureInAuFlag is set equal to 1:
        There is at least one picture with discardable_flag equal to 1 in the access unit auA.
        There is an access unit auB that follows the access unit auA in decoding order and the access unit auB satisfies one or more of the following conditions:
            The access unit belongs to a different POC resetting period than the access unit auA.
            The access unit has an IRAP picture with nuh_layer_id equal to 0 and NoClrasOutputFlag equal to 1.
            The access unit is the last access unit in the bitstream.
        and in addition, there is no picture with a particular value of nuh_layer_id layerIdA in the access unit auA, and there is a picture with nuh_layer_id equal to layerIdA that follows the access unit auA in decoding order and precedes the access unit auB in decoding order.
    Otherwise, the value of absentPictureInAuFlag is set to be 0.

Exemplary Embodiment 3

This embodiment is based on Embodiments 1 and 2, with the difference being that the value of discardable_flag is disallowed to be 1 for IRAP pictures, and the derivation of the variable absentPictureInAuFlag does not consider the value of discardable_flag of pictures. The changes to the slice header semantics with respect to Embodiment 1 are shown below:

TABLE 3

Exemplary Embodiment 3 discardable_flag equal to 1 specifies that the coded picture is not used as a reference picture for inter prediction and is not used as an inter-layer reference picture in the decoding process of subsequent pictures in decoding order. discardable_flag equal to 0 specifies that the coded picture may be used as a reference picture for inter prediction and may be used as an inter-layer reference picture in the decoding process of subsequent pictures in decoding order. When not present, the value of discardable_flag is inferred to be equal to 0.
When nal_unit_type is equal to TRAIL_R, TSA_R, STSA_R, RASL_R, ~~or~~ RADL_R, *BLA_W_LP, BLA_W_RADL, BLA_N_LP, IDR_W_LP, IDR_N_LP and CRA_NUT*, the value of discardable_flag shall be equal to 0.
...
The change to the derivation of variable absentPictureInAuFlag may be as follows:
*The variable absentPictureInAuFlag is derived as follows:*
    If ~~any of the two following conditions is true, the value of absentPictureInAuFlag is to be 1:~~
        ~~There is at least one picture in the same access unit that has discardable_flag equal to 1.~~
        ~~T~~*the number of pictures in the access unit is less the number of layers in the bitstream, the value of absentPictureInAuFlag is set to be 1.*
    *Otherwise, the value of absentPictureInAuFlag is set to be 0.*
Or,
*When an access unit auA has an IRAP picture with nuh_layer_id equal to 0 or an IDR picture with nuh_layer_id greater than 0, the variable absentPictureInAuFlag is derived as follows for the access unit auA:*
    If ~~any of the two following conditions is true, the value of absentPictureInAuFlag is set equal to 1:~~
        ~~There is at least one picture with discardable_flag equal to 1 in the access unit auA.~~
        ~~T~~*there is an access unit auB that follows the access unit auA in decoding order and the access unit auB satisfies one or more of the following conditions:*
            *The access unit belongs to a different POC resetting period than the access unit auA.*
            *The access unit has an IRAP picture with nuh_layer_id equal to 0 and NoClrasOutputFlag equal to 1.*
            *The access unit is the last access unit in the bitstream.*
        *and in addition, there is no picture with a particular value of nuh_layer_id layerIdA in the access unit auA, and there is a picture with nuh_layer_id equal to layerIdA that follows the access unit auA and precedes the access unit auB in decoding order.*
    *Otherwise, the value of absentPictureInAuFlag is set to be 0.*

Exemplary Embodiment 4

This embodiment is based on Embodiment 1, with the difference being that the derivation of the value of the variable absentPictureInAuFlag is as follows:

TABLE 4

Exemplary Embodiment 4

*When an access unit auA has an IRAP picture with nuh_layer_id equal to 0 or an IDR picture with nuh_layer_id greater than 0, the variable absentPictureInAuFlag is derived as follows for the access unit auA:*

*If any of the following two conditions is true, the value of absentPictureInAuFlag is set equal to 1:*

*There is at least one picture with discardable_flag equal to 1 in the access unit auA.*
        *There is at least one missing picture in the access unit auA. In other words, the following condition is true. Let auB be the first access unit that follows auA in decoding order and belongs to a different POC resetting period than the access unit auA, when present. Let auC be the first access unit that follows auA in decoding order and has an IRAP picture with nuh_layer_id equal to 0 and NoClrasOutputFlag equal to 1, when present. Let auD be the first access unit that follows auA in decoding order and has an IRAP picture picture in each of the layers in the bitstream, when present. There is no picture with nuh_layer equal to any particular value of nuh_layer_id layerIdA in the access unit auA, there is a picture picA with nuh_layer_id equal to layerIdA that follows auA in decoding order, and either none of auB, auC, and auD exists in the bitstream, or the picture picA precedes, in decoding order, the first of auB (when present), auC (when present), and auD (when present) in decoding order.*

*Otherwise, the value of absentPictureInAuFlag is set to be 0.*

Method of Resetting POC

Figure 8:
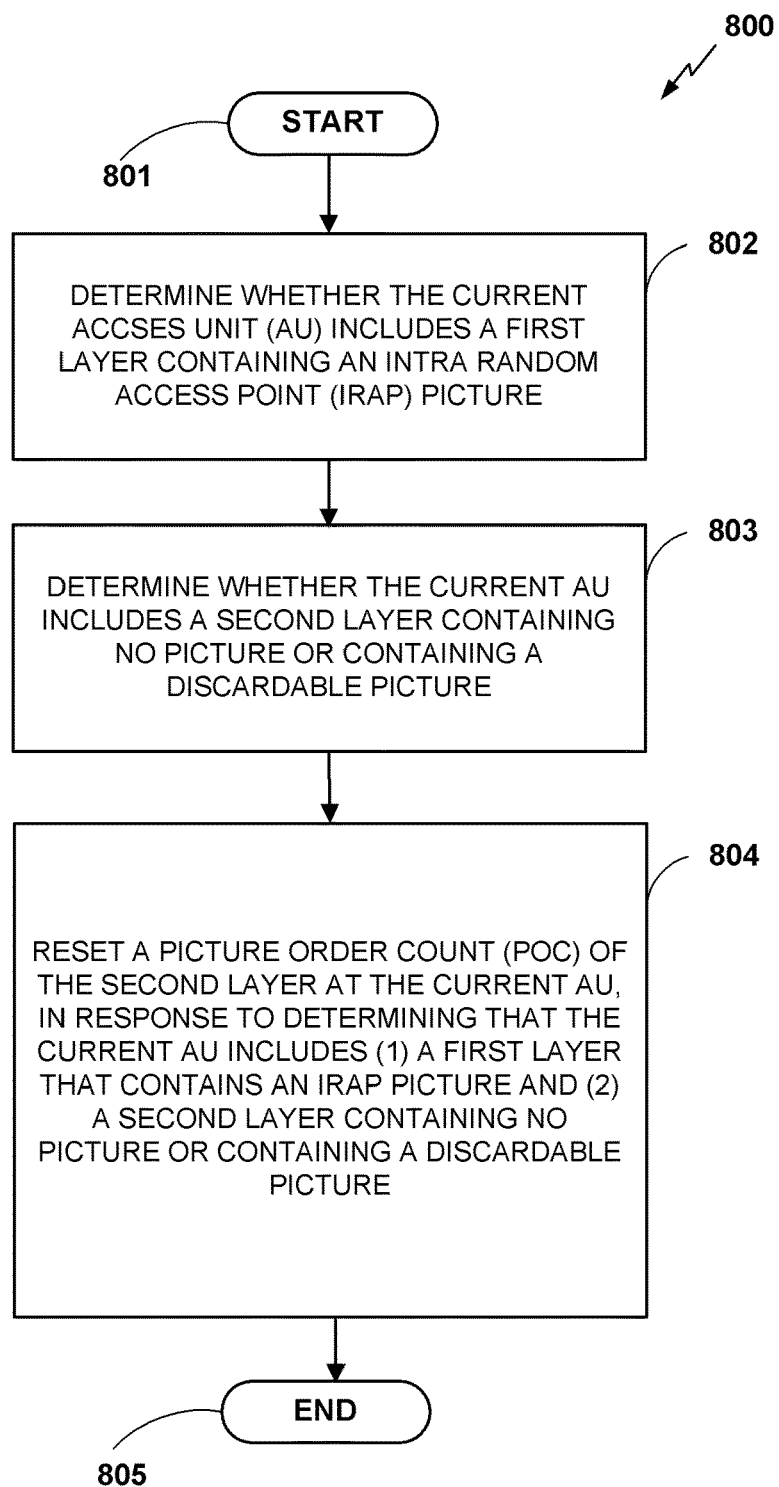
FIG. 8 is a flowchart illustrating a method of coding video information, according to one or more aspects of the present disclosure.

FIG. 8 is a flowchart illustrating a method of coding video information, according to one or more aspects of the present disclosure. The method relates to resetting the POC. The process 800 may be performed by an encoder (e.g., the encoder as shown in FIG. 2A, 2B, etc.), a decoder (e.g., the decoder as shown in FIG. 3A, 3B, etc.), or any other component, depending on the embodiment. The blocks of the process 800 are described with respect to the decoder 33 in FIG. 3B, but the process 800 may be performed by other components, such as an encoder, as mentioned above. The layer 1 video decoder 30B of the decoder 33 and/or the layer 0 decoder 30A of the decoder 33 may perform the process 800, depending on the embodiment. All embodiments described with respect to FIG. 8 may be implemented separately, or in combination with one another. Certain details relating to the process 800 are explained above, e.g., with respect to FIG. 4-7.

The process 800 starts at block 801. The decoder 33 can include a memory (e.g., decoded picture buffer 160) for storing video information associated with a plurality of layers. The decoder 33 may obtain information associated with a current AU to be coded. The current AU can contain pictures from one or more layers of the plurality of layers.

At block 802, the decoder 33 determines whether the current AU includes a first layer containing an IRAP picture.

At block 803, the decoder 33 determines whether the current AU includes a second layer containing no picture or containing a discardable picture.

At block 804, the decoder 33 resets the POC of the second layer at the current AU, in response to determining that the current AU includes (1) a first layer that contains an IRAP picture and (2) a second layer containing no picture or containing a discardable picture. In some embodiments, the decoder 33 resets the POC of the first layer at the current AU, in response to determining that the current AU includes (1) a first layer that contains an IRAP picture and (2) a second layer containing no picture or containing a discardable picture. In one embodiment, the first layer is a base layer. In another embodiment, the first layer is an enhancement layer and the IRAP picture is an IDR picture. The decoder 33 may reset the POC of a layer by setting a value of a first syntax element indicative of whether to reset the POC. In one embodiment, the first syntax element is poc_reset_idc.

In certain embodiments, the decoder 33, in response to resetting the POC of the second layer at the current AU, for an AU that is subsequent to the current AU in decoding order, sets the value of the first syntax element to indicate that the POC of the second layer was reset at a prior AU.

In some embodiments, the decoder 33 sets the value of the first syntax element to indicate that the POC of the second layer was reset at a prior AU for one or more AUs subsequent to the current AU in decoding order. The one or more subsequent AUs can start with a first AU containing a first picture having the same layer ID as the second layer and end with a second AU subsequent to the first AU in decoding order containing a second picture having the same layer ID as the second layer, inclusive. In one embodiment, the second picture has a temporal ID equal to 0 and is not a discardable picture. In certain embodiments, additionally, the second picture is not a RASL picture, is not a RADL picture, or is not a SLNR of the second layer.

In certain embodiments, the decoder 33 is a wireless communication device, further comprising a receiver configured to receive video data according to at least one radio access technology (RAT), the video data comprising the video information associated with the plurality of layers; and a transmitter configured to operate in accordance with the at least one RAT. The wireless communication device may be a cellular telephone, and the received video data may be received by the receiver and may be modulated according to cellular communication standard.

In some embodiments, the process 800 may be executable on a wireless communication device comprising: a receiver configured to receive video data according to at least one radio access technology (RAT), the video data comprising the video information associated with the plurality of layers; a transmitter configured to operate in accordance with the at least one RAT; a memory configured to store the video data; and a processor configured to execute instructions to process the video data stored in the memory. The wireless communication device may be a cellular telephone, and the received video data may be received by the receiver and may be modulated according to cellular communication standard.

The process 800 ends at block 805. Blocks may be added and/or omitted in the process 800, depending on the embodiment, and blocks of the process 800 may be performed in different orders, depending on the embodiment.

Any features and/or embodiments described with respect to resetting the POC in this disclosure may be implemented separately or in any combination thereof. For example, any features and/or embodiments described in connection with FIGS. 1-7 and other parts of the disclosure may be implemented in any combination with any features and/or embodiments described in connection with FIG. 8, and vice versa.

Method of Setting full_poc_reset_flag

Figure 9:
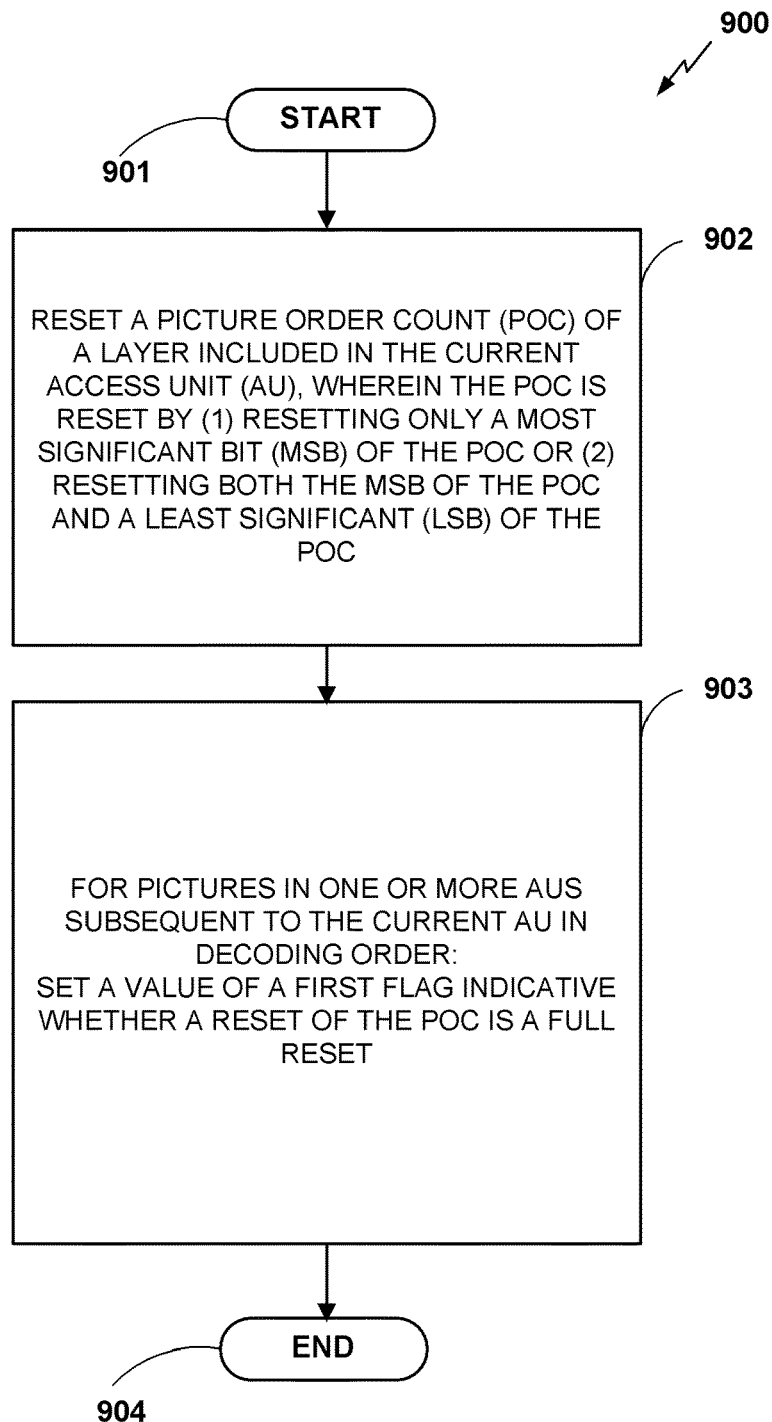
FIG. 9 is a flowchart illustrating a method of coding video information, according to one or more aspects of the present disclosure.

FIG. 9 is a flowchart illustrating a method of coding video information, according to one or more aspects of the present disclosure. The method relates to setting the value of full_poc_reset_flag. The process 900 may be performed by an encoder (e.g., the encoder as shown in FIG. 2A, 2B, etc.), a decoder (e.g., the decoder as shown in FIG. 3A, 3B, etc.), or any other component, depending on the embodiment. The blocks of the process 900 are described with respect to the decoder 33 in FIG. 3B, but the process 900 may be performed by other components, such as an encoder, as mentioned above. The layer 1 video decoder 30B of the decoder 33 and/or the layer 0 decoder 30A of the decoder 33 may perform the process 900, depending on the embodiment. All embodiments described with respect to FIG. 9 may be implemented separately, or in combination with one another. Certain details relating to the process 900 are explained above, e.g., with respect to FIG. 4-7.

The process 900 starts at block 901. The decoder 33 can include a memory (e.g., decoded picture buffer 160) for storing video information associated with a plurality of layers. The decoder 33 may obtain information associated with a current AU to be coded. The current AU can contain pictures from one or more layers of the plurality of layers.

At block 902, the decoder 33 resets the POC of a layer included in the current AU via (1) resetting only the MSB of the POC or (2) resetting both the MSB of the POC and the LSB of the POC. For example, the POC of the layer is reset at the current AU.

At block 903, for pictures in one or more Ails subsequent to the current AU in decoding order, the decoder 33 sets the value of a first flag indicative whether a reset of the POC is a full reset. In one embodiment, the value of the first flag is set equal to 0 when the POC is reset by (1) resetting only the MSB of the POC, and the value of the first flag is set equal to 1 when the POC is reset by (2) resetting both the MSB of the POC and the LSB of the POC. The pictures from the one or more layers in the current AU may have the same POC resetting period. In one embodiment, the first flag is full_poc_reset_flag. The value of the first flag may correspond to the value of a second flag indicative of whether to reset the POC. In one embodiment, the second flag is poc_reset_idc.

In some embodiments, the value of the first flag is set equal to 0 when the second flag indicates that the value of the second flag indicates that only the MSB of the POC should be reset, and wherein the value of the second flag is set equal to 1 when the second flag indicates that both the MSB and the LSB of the POC should be reset.

In certain embodiments, the decoder 33 is a wireless communication device, further comprising a receiver configured to receive video data according to at least one radio access technology (RAT), the video data comprising the video information associated with the plurality of layers; and a transmitter configured to operate in accordance with the at least one RAT. The wireless communication device may be a cellular telephone, and the received video data may be received by the receiver and may be modulated according to cellular communication standard.

In some embodiments, the process 900 may be executable on a wireless communication device comprising: a receiver configured to receive video data according to at least one radio access technology (RAT), the video data comprising the video information associated with the plurality of layers; a transmitter configured to operate in accordance with the at least one RAT; a memory configured to store the video data; and a processor configured to execute instructions to process the video data stored in the memory. The wireless communication device may be a cellular telephone, and the received video data may be received by the receiver and may be modulated according to cellular communication standard.

The process 900 ends at block 904. Blocks may be added and/or omitted in the process 900, depending on the embodiment, and blocks of the process 900 may be performed in different orders, depending on the embodiment.

Any features and/or embodiments described with respect to setting the value of full_poc_reset_flag in this disclosure may be implemented separately or in any combination thereof. For example, any features and/or embodiments described in connection with FIGS. 1-7 and other parts of the disclosure may be implemented in any combination with any features and/or embodiments described in connection with FIG. 9, and vice versa.

Information and signals disclosed herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may be implemented in hardware (e.g., computer hardware), software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer readable medium (e.g., a computer-readable data storage medium) comprising program code including instructions that, when executed, performs one or more of the methods described above. The computer readable medium may be a non-transitory computer readable medium. The computer-readable medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC). Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of inter-operative hardware units, including one or more processors as described above, in conjunction with suitable software and/or firmware.

Various embodiments of the disclosure have been described. These and other embodiments are within the scope of the following claims.

What is claimed is:

1. An apparatus for coding video information, the apparatus comprising:
    a memory unit for storing a portion of the video information, the portion being associated with a plurality of layers; and
    a processor operationally coupled to the memory unit and configured to:
        obtain information associated with a current access unit (AU) of the portion of the video information stored to the memory unit, the current AU containing pictures from the plurality of layers;
        determine that the current AU includes an intra random access point (IRAP) picture from a first layer of the plurality of layers;
        determine that the current AU either includes a discardable picture from a second layer of the plurality of layers or includes no picture from the second layer of the plurality of layers; and
        reset both a most significant bit (MSB) and a least significant bit (LSB) of a picture order count (POC) value of any pictures in the first layer or the second layer at the current AU, in response to the determinations that the current AU includes the IRAP picture from the first layer and either the discardable picture or no picture from the second layer.

2. The apparatus of claim 1, wherein to reset the POC value, the processor is configured to set a value of a first syntax element to indicate that the POC value of the second layer is to be reset.

3. The apparatus of claim 2, wherein the first syntax element comprises a poc_reset_idc syntax element.

4. The apparatus of claim 2, wherein the processor is further configured to set, in response to resetting the POC value of the second layer at the current AU, for a subsequent AU that is positioned subsequently to the current AU in decoding order, a value of a corresponding syntax element to indicate that the POC value of the second layer was reset at a prior AU of the subsequent AU.

5. The apparatus of claim 4, wherein to set the syntax element, the processor is configured to set the value of the corresponding syntax element to indicate that the POC value of the second layer was reset at the prior AU for one or more AUs positioned subsequently to the current AU in decoding order, the one or more subsequent AUs starting with a first AU containing a first picture having a same layer ID as the second layer and ending with a second AU containing a second picture having the same layer ID as the second layer, wherein:
    the second picture has a temporal ID equal to zero (0),
    the second picture is not a discardable picture, and
    the second picture is not any of a random access skipped leading (RASL) picture, a random access decodable leading (RADL) picture, or a sub-layer non-reference picture (SLNR) of the second layer.

6. The apparatus of claim 1, wherein the first layer is a base layer.

7. The apparatus of claim 1, wherein the first layer is an enhancement layer and the IRAP picture is an instantaneous decoding refresh (IDR) picture.

8. The apparatus of claim 1, wherein the apparatus is a wireless communication device, further comprising:
    a receiver configured to receive video data according to at least one radio access technology (RAT), the video data comprising the video information associated with the plurality of layers; and
    a transmitter configured to operate in accordance with the at least one RAT.

9. The apparatus of claim 8, wherein the wireless communication device is a cellular telephone and the received video data is received by the receiver and is modulated according to cellular communication standard.

10. A method of coding video information, the method comprising:
    storing a portion of the video information, the portion being associated with a plurality of layers;

obtaining information associated with a current access unit (AU) of the video information to be coded, the current AU containing pictures from the plurality of layers;

determining that the current AU includes an intra random access point (IRAP) picture from a first layer of the plurality of layers;

determining that the current AU either includes a discardable picture from a second layer of the plurality of layers or includes no picture from the second layer of the plurality of layers; and resetting both a most significant bit (MSB) and a least significant bit (LSB) of a picture order count (POC) value of any pictures in the first layer or the second layer at the current AU, in response to the determinations that the current AU includes the IRAP picture from the first layer and either the discardable picture or no picture from the second layer.

11. The method of claim 10, wherein resetting the POC value of the second layer comprises setting a value of a syntax element to indicate that the POC value of the second layer is to be reset.

12. The method of claim 11, wherein the syntax element comprises a poc_reset_idc syntax element.

13. The method of claim 11, further comprising:
in response to resetting the POC of the second layer at the current AU, setting, for subsequent AU that is positioned subsequently to the current AU in decoding order, a value of a corresponding syntax element to indicate that the POC value of the second layer was reset at a prior AU of the subsequent AU.

14. The method of claim 13, wherein setting the syntax element comprises setting the value of the corresponding syntax element to indicate that the POC value of the second layer was reset at the prior AU for one or more AUs positioned subsequently to the current AU in decoding order, the one or more subsequent AUs starting with a first AU containing a first picture having a same layer ID as the second layer and ending with a second AU containing a second picture having the same layer ID as the second layer, wherein:
the second picture has a temporal ID equal to zero (0),
the second picture is not a discardable picture, and
the second picture is not any of a random access skipped leading (RASL) picture, a random access decodable leading (RADL) picture, or a sub-layer non-reference picture (SLNR) of the second layer.

15. The method of claim 10, wherein the first layer is a base layer.

16. The method of claim 10, wherein the first layer is an enhancement layer and the IRAP picture is an instantaneous decoding refresh (IDR) picture.

17. The method of claim 10, the method being executable on a wireless communication device, wherein the device comprises:
a receiver configured to receive video data according to at least one radio access technology (RAT), the video data comprising the video information associated with the plurality of layers;
a transmitter configured to operate in accordance with the at least one RAT;
a memory configured to store the video data; and
a processor configured to execute instructions to process the video data stored in the memory.

18. The method of claim 17, wherein the wireless communication device is a cellular telephone and the received video data is received by the receiver and is modulated according to a cellular communication standard.

19. A non-transitory computer readable storage medium comprising instructions that when executed on a processor comprising computer hardware cause the processor to:
store a portion of the video information to the non-transitory computer readable storage medium, the portion being associated with a plurality of layers;
obtain information associated with a current access unit (AU) to be coded of the portion of the video information stored to the non-transitory computer readable storage medium, the current AU containing pictures from the plurality of layers;
determine that the current AU includes an intra random access point (IRAP) picture from a first layer of the plurality of layers;
determine that the current AU either includes a discardable picture from a second layer of the plurality of layers or includes no picture from the second layer of the plurality of layers; and
reset both a most significant bit (MSB) and a least significant bit (LSB) of a picture order count (POC) value of any pictures in the first layer or the second layer at the current AU, in response to the determinations that the current AU includes the IRAP picture from the first layer and either the discardable picture or no picture from the second layer.

20. An apparatus for coding video information, comprising:
means for storing a portion of the video information, the portion being associated with a plurality of layers;
means for obtaining information associated with a current access unit (AU) of the video information to be coded, the current AU containing pictures from the plurality of layers;
means for determining that the current AU includes an intra random access point (IRAP) picture from a first layer of the plurality of layers;
means for determining that the current AU either includes a discardable picture from a second layer of the plurality of layers or includes no picture from the second layer of the plurality of layers; and
means for resetting both a most significant bit (MSB) and a least significant bit (LSB) of a picture order count (POC) value of any pictures in the first layer or the second layer at the current AU, in response to the determinations that the current AU includes the IRAP picture from the first layer and either the discardable picture or no picture from the second layer.

21. The apparatus of claim 1, wherein the IRAP picture is a clean random access (CRA) picture.

22. The apparatus of claim 1, wherein the IRAP picture is a broken link access (BLA) picture.

23. The method of claim 10, wherein the IRAP picture is a clean random access (CRA) picture.

24. The method of claim 10, wherein the IRAP picture is a broken link access (BLA) picture.

* * * * *